United States Patent
Rondao Alface et al.

(10) Patent No.: US 12,120,306 B2
(45) Date of Patent: Oct. 15, 2024

(54) V3C PATCH REMESHING FOR DYNAMIC MESH CODING

(71) Applicant: Nokia Technologies Oy, Espoo (FI)

(72) Inventors: Patrice Rondao Alface, Evere (BE); Aleksei Martemianov, Tampere (FI); Lukasz Kondrad, Munich (DE); Lauri Aleksi Ilola, Munich (DE); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 18/116,937

(22) Filed: Mar. 3, 2023

(65) Prior Publication Data

US 2023/0300336 A1 Sep. 21, 2023

Related U.S. Application Data

(60) Provisional application No. 63/321,176, filed on Mar. 18, 2022.

(51) Int. Cl.
*H04N 19/132* (2014.01)
*H04N 19/182* (2014.01)
*H04N 19/20* (2014.01)

(52) U.S. Cl.
CPC ......... *H04N 19/132* (2014.11); *H04N 19/182* (2014.11); *H04N 19/20* (2014.11)

(58) Field of Classification Search
CPC .................................................. H04N 19/132
USPC .................................................. 375/240.02
See application file for complete search history.

(56) References Cited

U.S. PATENT DOCUMENTS

| 9,478,002 | B2 * | 10/2016 | Yang ...................... H04N 19/50 |
| 11,823,421 | B2 * | 11/2023 | Iiola ........................ G06T 9/001 |
| 2021/0097724 | A1 * | 4/2021 | Roimela ................ H04N 19/70 |

(Continued)

OTHER PUBLICATIONS

Michael Garland and Paul S. Heckbert. Simplifying surfaces with color and texture using quadric error metrics. In Proceedings of the conference on Visualization '98 (VIS '98). IEEE Computer Society Press, Washington, DC, USA, 263-269, 1998.

(Continued)

*Primary Examiner* — Yulin Sun
(74) *Attorney, Agent, or Firm* — Joseph C. Drish; Harrington & Smith

(57) ABSTRACT

An apparatus comprising circuitry configured to: obtain a three-dimensional model comprising at least one patch, at least one geometry component, at least one occupancy component, and zero or more texture components; subsample the at least one geometry component of the at least one patch of a three-dimensional object at occupied positions using a subsampling criterion; define respective search windows around the respective occupied positions; select respective salient points relative to the respective occupied positions within the respective search windows; triangulate the salient points to approximate a shape of the three-dimensional object; detect zero or more triangles that overlap with at least one unoccupied pixel; split the zero or more triangles that overlap with at least one unoccupied pixel until no triangle overlaps with the unoccupied pixels; and add zero or more additional triangles close to a border of the three-dimensional object to generate a resulting mesh signaled to a decoder.

30 Claims, 6 Drawing Sheets

(56) References Cited

U.S. PATENT DOCUMENTS

2022/0108482 A1* 4/2022 Graziosi ............... G06T 9/001

OTHER PUBLICATIONS

Hoppe, H. Progressive meshes. In Proceedings of the 23rd annual conference on Computer graphics and interactive techniques (pp. 99-108), 1996.

Hugues Hoppe. 1999. New quadric metric for simplifiying meshes with appearance attributes. In *Proceedings of the conference on Visualization '99: celebrating ten years (VIS '99)*. IEEE Computer Society Press, Washington, DC, USA, 59-66.

Guskov, I., Vidimče, K., Sweldens, W., & Schröder, P. (Jul. 2000). Normal meshes. *In Proceedings of the 27th annual conference on Computer graphics and interactive techniques* (pp. 95-102).

Rossignac, J. "Edgebreaker: Connectivity compression for triangle meshes", *IEEE Transactions on Visualization and Computer Graphics*, vol. 5, No. 1, pp. 47-61, Jan.-Mar. 1999.

https://github.com/google/draco [downloaded on Mar. 2, 2023].

\* cited by examiner

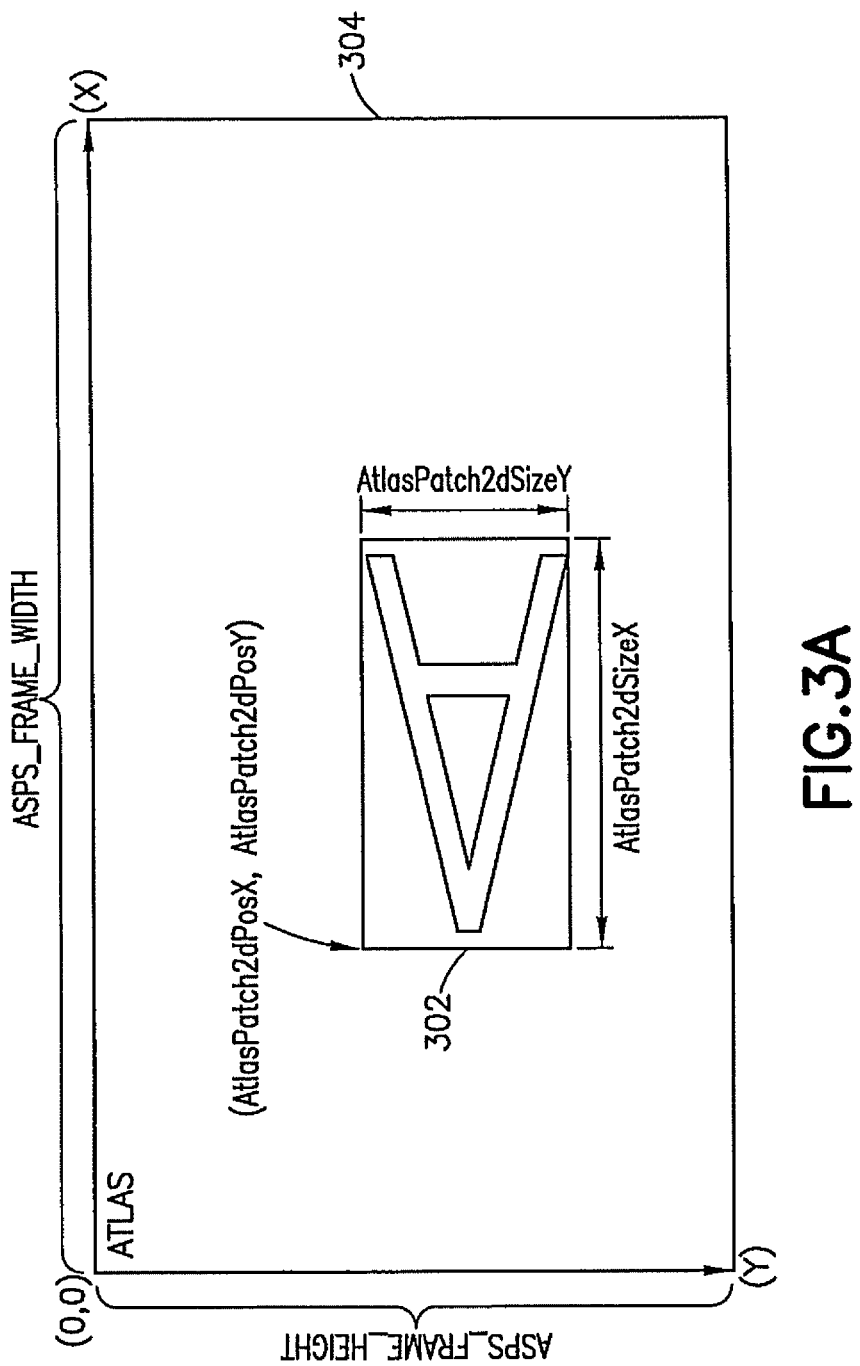

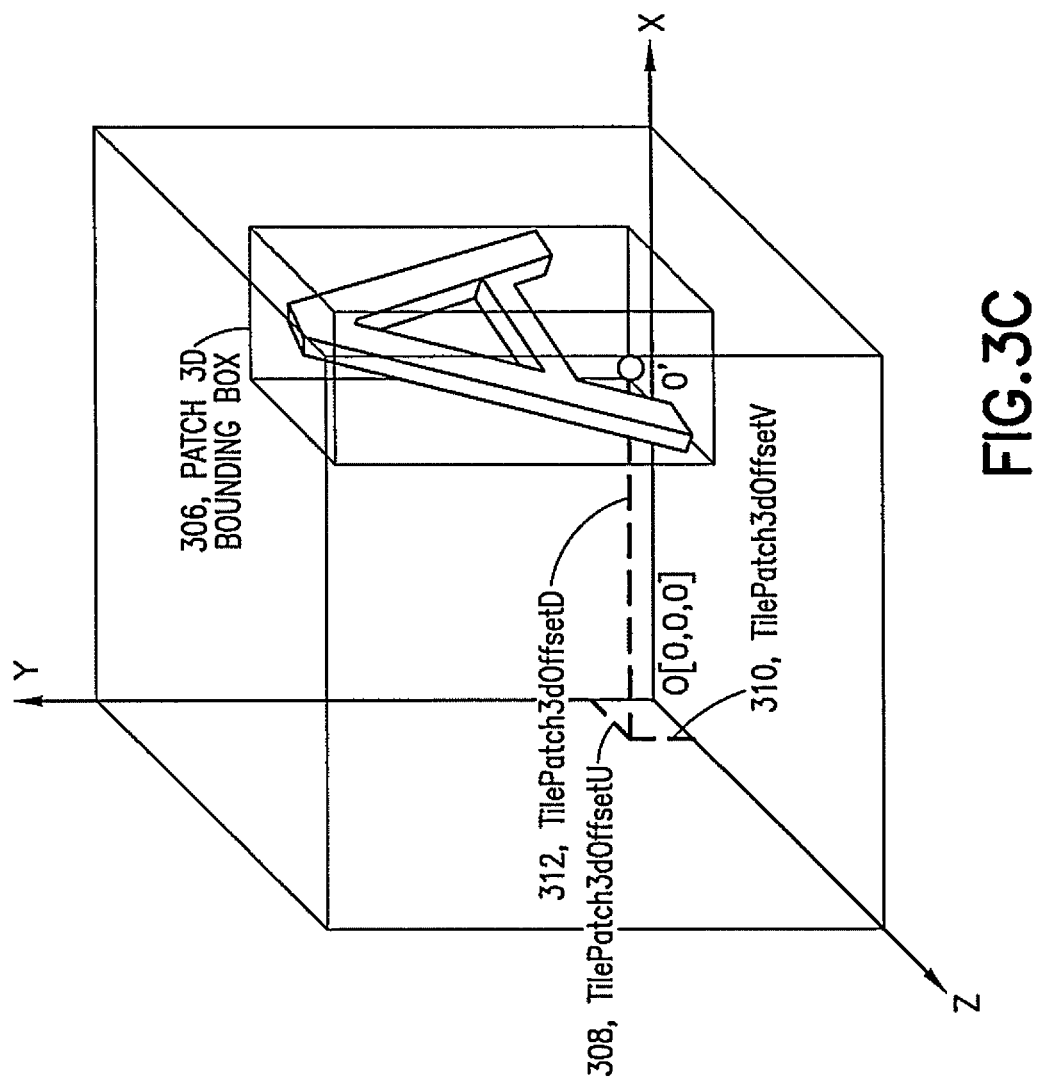

V3C PATCH REMESHING FOR DYNAMIC MESH CODING

RELATED APPLICATION

This application claims priority to U.S. Provisional Application No. 63/321,176, filed Mar. 18, 2022, which is hereby incorporated by reference in its entirety.

TECHNICAL FIELD

The examples and non-limiting embodiments relate generally to volumetric video coding, and more particularly, to V3C patch remeshing for dynamic mesh coding.

BACKGROUND

It is known to perform video coding and decoding.

SUMMARY

In accordance with an aspect, an apparatus includes: at least one processor; and at least one non-transitory memory storing instructions that, when executed by the at least one processor, cause the apparatus at least to: obtain a three-dimensional model comprising at least one patch, at least one geometry component, at least one occupancy component, and zero or more texture components; subsample the at least one geometry component of the at least one patch of a three-dimensional object at occupied positions using a subsampling criterion; define respective search windows around the respective occupied positions; select respective salient points relative to the respective occupied positions within the respective search windows; triangulate the salient points to approximate a shape of the three-dimensional object; detect zero or more triangles that overlap with at least one unoccupied pixel; split the zero or more triangles that overlap with at least one unoccupied pixel until no triangle overlaps with the unoccupied pixels; and add zero or more additional triangles close to a border of the three-dimensional object to generate a resulting mesh that is signaled to a decoder.

In accordance with an aspect, an apparatus includes: at least one processor; and at least one non-transitory memory storing instructions that, when executed by the at least one processor, cause the apparatus at least to: receive a three-dimensional object comprising at least one patch, at least one geometry component, at least one occupancy component, and zero or more texture components; define multiple sets of parameters describing sub-sampling criteria, a size of a search window, and types of salient points; generate a mesh using a depth patch triangulation method using the sets of parameters to approximate a shape of the three-dimensional object; evaluate a quality of a depth patch triangulation compared to a reconstructed three-dimensional object reconstructed without triangulated depth patches; iterate until a reconstructed three-dimensional object using the depth patch triangulation method reaches an expected improved quality; derive at least one parameter used to code the mesh with improved quality; and transmit to a decoder the coded mesh as a bitstream and the at least one parameter.

In accordance with an aspect, an apparatus includes: at least one processor; and at least one non-transitory memory storing instructions that, when executed by the at least one processor, cause the apparatus at least to: receive a coded mesh as a bitstream, wherein the mesh is used to approximate a shape of a three-dimensional object; wherein the mesh has been coded with depth patch triangulation method using multiple sets of parameters to approximate the shape of the three-dimensional object; wherein the multiple sets of parameters describe sub-sampling criteria, a size of a search window, and types of salient points; receive at least one parameter used to code the mesh with improved quality; and reconstruct the mesh from the bitstream using the at least one parameter.

In accordance with an aspect, an apparatus includes: at least one processor; and at least one non-transitory memory storing instructions that, when executed by the at least one processor, cause the apparatus at least to: receive signaling from an encoder, the signaling related to encoding a three-dimensional model comprising at least one patch, at least one geometry component, at least one occupancy component, and zero or more texture components; subsample the at least one geometry component of the at least one patch of a three-dimensional object at occupied positions using a subsampling criterion; define respective search windows around the respective occupied positions; select respective salient points relative to the respective occupied positions within the respective search windows; triangulate the salient points to approximate a shape of the three-dimensional object; detect zero or more triangles that overlap with at least one unoccupied pixel; split the zero or more triangles that overlap with at least one unoccupied pixel until no triangle overlaps with the unoccupied pixels; add zero or more additional triangles close to a border of the three-dimensional object; and reconstruct a mesh of the three-dimensional object, based on the received signaling.

BRIEF DESCRIPTION OF THE DRAWINGS

The foregoing aspects and other features are explained in the following description, taken in connection with the accompanying drawings, wherein:

FIG. 3A shows an example of an atlas coordinate system.

FIG. 3C shows an example of a final target 3D coordinate system.

FIG. 7A shows a patch depth map (geometry component) with unoccupied pixels represented as dashed circles.

FIG. 7B shows a straightforward regular triangulation of occupied (valid) pixels of the depth map (geometry component) shown in FIG. 7A.

FIG. 9 illustrates example signaling to mark the presence of mesh based syntax elements.

FIG. 10 illustrates example signaling of information related to the local search window size of the local optimization portion of the remeshing algorithm described herein.

FIG. 11 illustrates example signaling of information related to the salient point type of the local optimization portion of the remeshing algorithm described herein.

FIG. 13A shows defining a search window during local optimization.

FIG. 13B shows selecting a salient point during local optimization.

FIG. 15A shows non-coverage of unoccupied pixels, where edges are represented for two triangles that overlap unoccupied pixels in their vicinity.

FIG. 15B shows non-coverage of unoccupied pixels, namely a process of triangle correction.

DETAILED DESCRIPTION OF EXAMPLE EMBODIMENTS

Figure 1A:
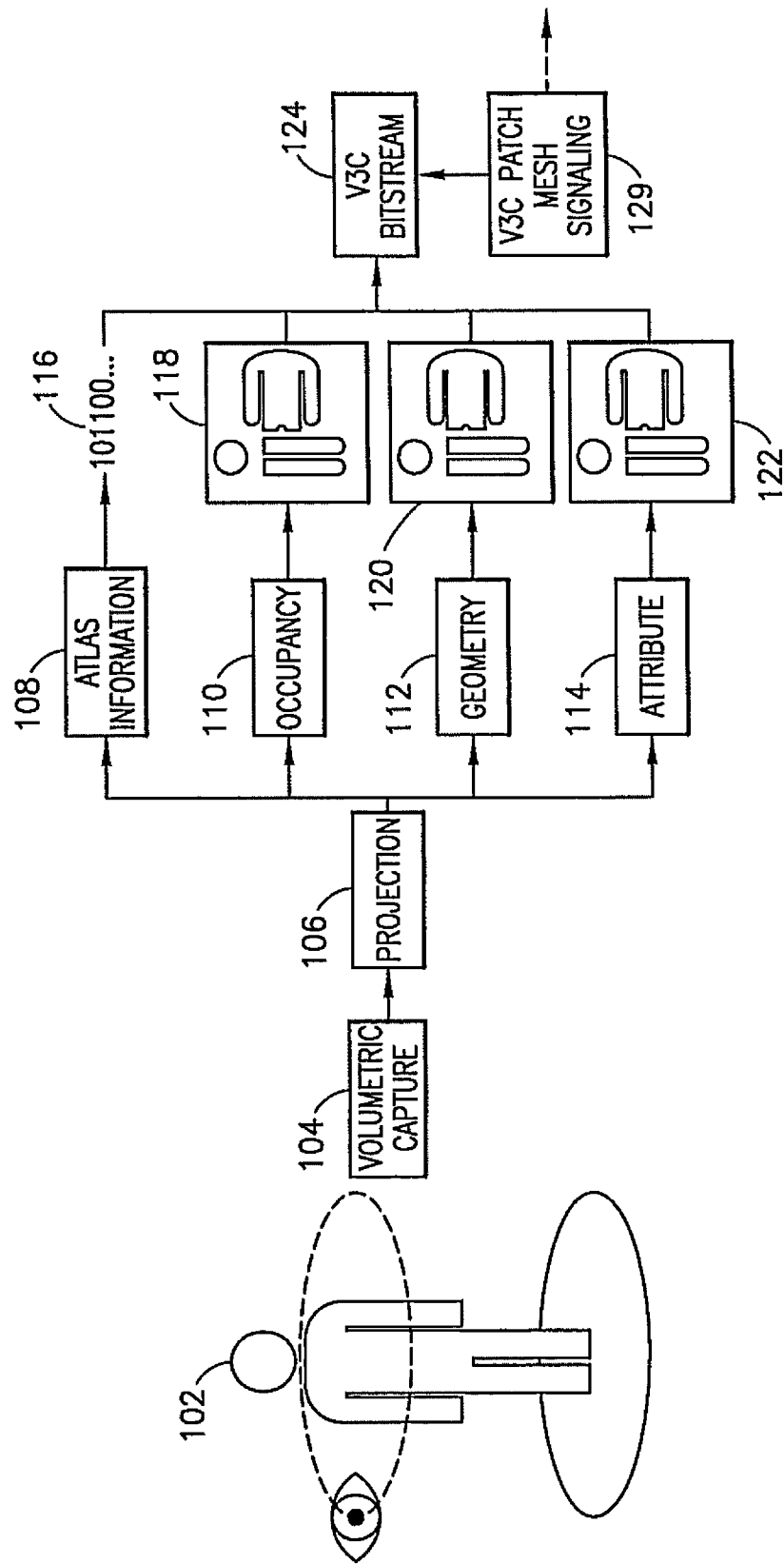
FIG. 1A is a diagram showing volumetric media conversion at an encoder side.

The examples described herein relate to the encoding, signaling and rendering of a volumetric video that is based on mesh coding. The examples described herein focus on methods improving the quality of reconstructed mesh surfaces. The examples described herein relate to methods to improve quality of decoded mesh textures and geometry by using its hierarchical representation which as a consequence increases compression efficiency of the encoding pipeline.

Volumetric Video Data

Volumetric video data represents a three-dimensional scene or object and can be used as input for AR, VR and MR applications. Such data describes geometry (shape, size, position in 3D-space) and respective attributes (e.g. color, opacity, reflectance, . . . ), plus any possible temporal transformations of the geometry and attributes at given time instances (like frames in 2D video). Volumetric video is either generated from 3D models, i.e. CGI, or captured from real-world scenes using a variety of capture solutions, e.g. multi-camera, laser scan, combination of video and dedicated depth sensors, and more. Also, a combination of CGI and real-world data is possible. Typical representation formats for such volumetric data are triangle meshes, point clouds, or voxels. Temporal information about the scene can be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for AR, VR, or MR applications, especially for providing 6DOF viewing capabilities.

Increasing computational resources and advances in 3D data acquisition devices have enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as a set of textures and a depth map as is the case in the multi-view plus depth framework. Closely related to the techniques used in multi-view plus depth is the use of elevation maps, and multi-level surface maps.

MPEG Visual Volumetric Video-Based Coding (V3C)

Selected excerpts from the ISO/IEC 23090-5 Visual Volumetric Video-based Coding and Video-based Point Cloud Compression 2nd Edition standard are referred to herein.

Visual volumetric video, a sequence of visual volumetric frames, if uncompressed, may be represented by a large amount of data, which can be costly in terms of storage and transmission. This has led to the need for a high coding efficiency standard for the compression of visual volumetric data.

The V3C specification enables the encoding and decoding processes of a variety of volumetric media by using video and image coding technologies. This is achieved through first a conversion of such media from their corresponding 3D representation to multiple 2D representations, also referred to as V3C components, before coding such information. Such representations may include occupancy, geometry, and attribute components. The occupancy component can inform a V3C decoding and/or rendering system of which samples in the 2D components are associated with data in the final 3D representation. The geometry component contains information about the precise location of 3D data in space, while attribute components can provide additional properties, e.g. texture or material information, of such 3D data. An example is shown in FIG. 1A and FIG. 1B.

Figure 1B:
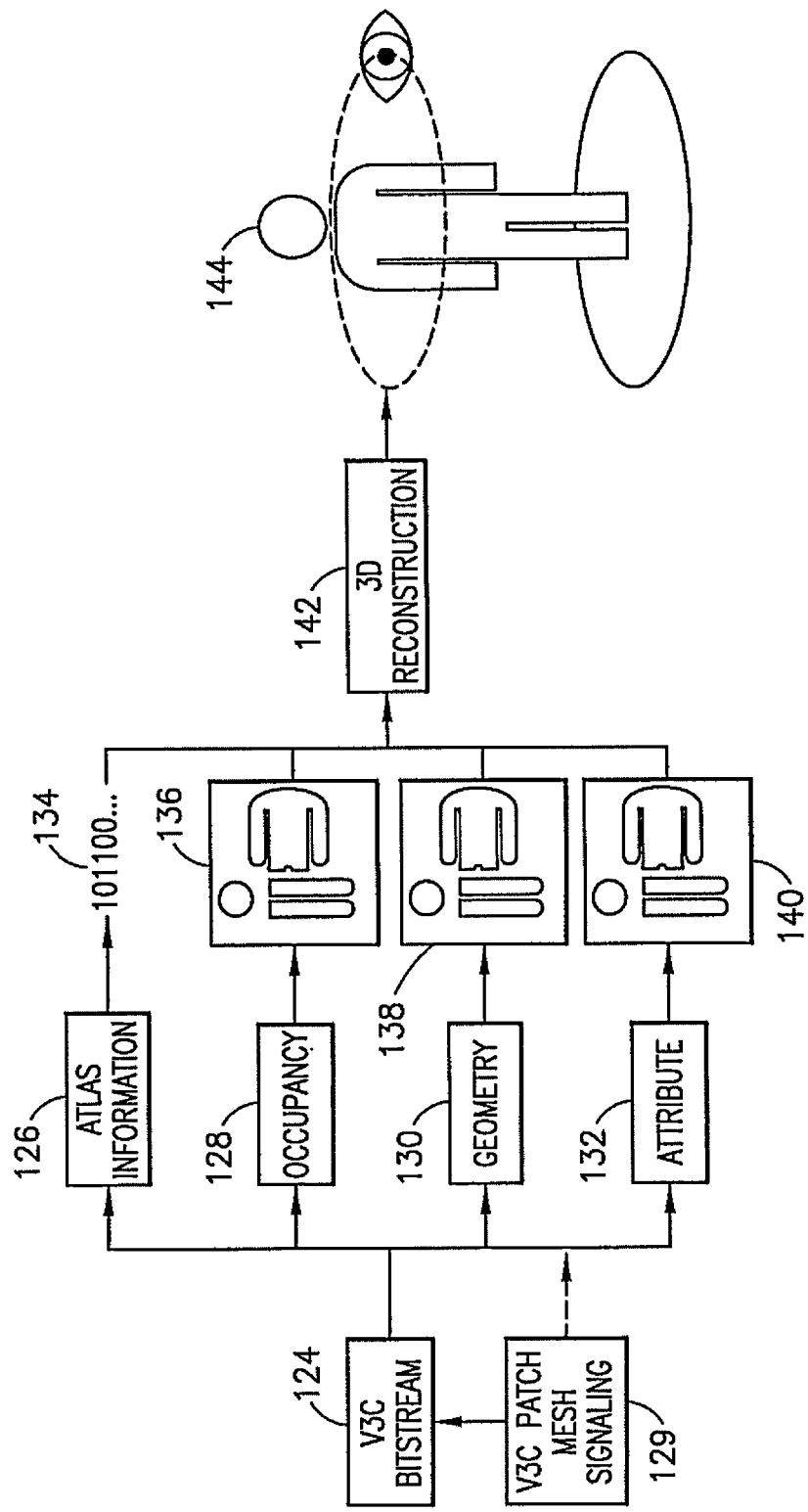
FIG. 1B is a diagram showing volumetric media reconstruction at a decoder side.

FIG. 1A shows volumetric media conversion at the encoder, and FIG. 1B shows volumetric media conversion at the decoder side. The 3D media 102 is converted to a series of 2D representations: occupancy 118, geometry 120, and attribute 122. Additional atlas information 108 is also included in the bitstream to enable inverse reconstruction. Refer to ISO/IEC 23090-5.

As further shown in FIG. 1A, a volumetric capture operation 104 generates a projection 106 from the input 3D media 102. In some examples, the projection 106 is a projection operation. From the projection 106, an occupancy operation 110 generates the occupancy 2D representation 118, a geometry operation 112 generates the geometry 2D representation 120, and an attribute operation 114 generates the attribute 2D representation 122. The additional atlas information 108 is included in the bitstream 116. The atlas information 108, the occupancy 2D representation 118, the geometry 2D representation 120, and the attribute 2D representation 122 are encoded into the V3C bitstream 124 to encode a compressed version of the 3D media 102. Based on the examples described herein, V3C patch mesh signaling 129 may also be signaled in the V3C bitstream 124 or directly to a decoder. The V3C patch mesh signaling 129 may be used on the decoder side, as shown in FIG. 1B.

As shown in FIG. 1B, a decoder using the V3C bitstream 124 derives 2D representations using an occupancy operation 128, a geometry operation 130 and an attribute operation 132. The atlas information operation 126 provides atlas information into a bitstream 134. The occupancy operation 128 derives the occupancy 2D representation 136, the geometry operation 130 derives the geometry 2D representation 138, and the attribute operation 132 derives the attribute 2D representation 140. The 3D reconstruction operation 142 generates a decompressed reconstruction 144 of the 3D media 102, using the atlas information 126/134, the occupancy 2D representation 136, the geometry 2D representation 138, and the attribute 2D representation 140.

Additional information that allows associating all these subcomponents and enables the inverse reconstruction, from a 2D representation back to a 3D representation is also included in a special component, referred to herein as the atlas. An atlas consists of multiple elements, namely patches. Each patch identifies a region in all available 2D components and contains information necessary to perform the appropriate inverse projection of this region back to the 3D space. The shape of such regions is determined through a 2D bounding box associated with each patch as well as their coding order. The shape of these regions is also further refined after the consideration of the occupancy information.

Figure 2:
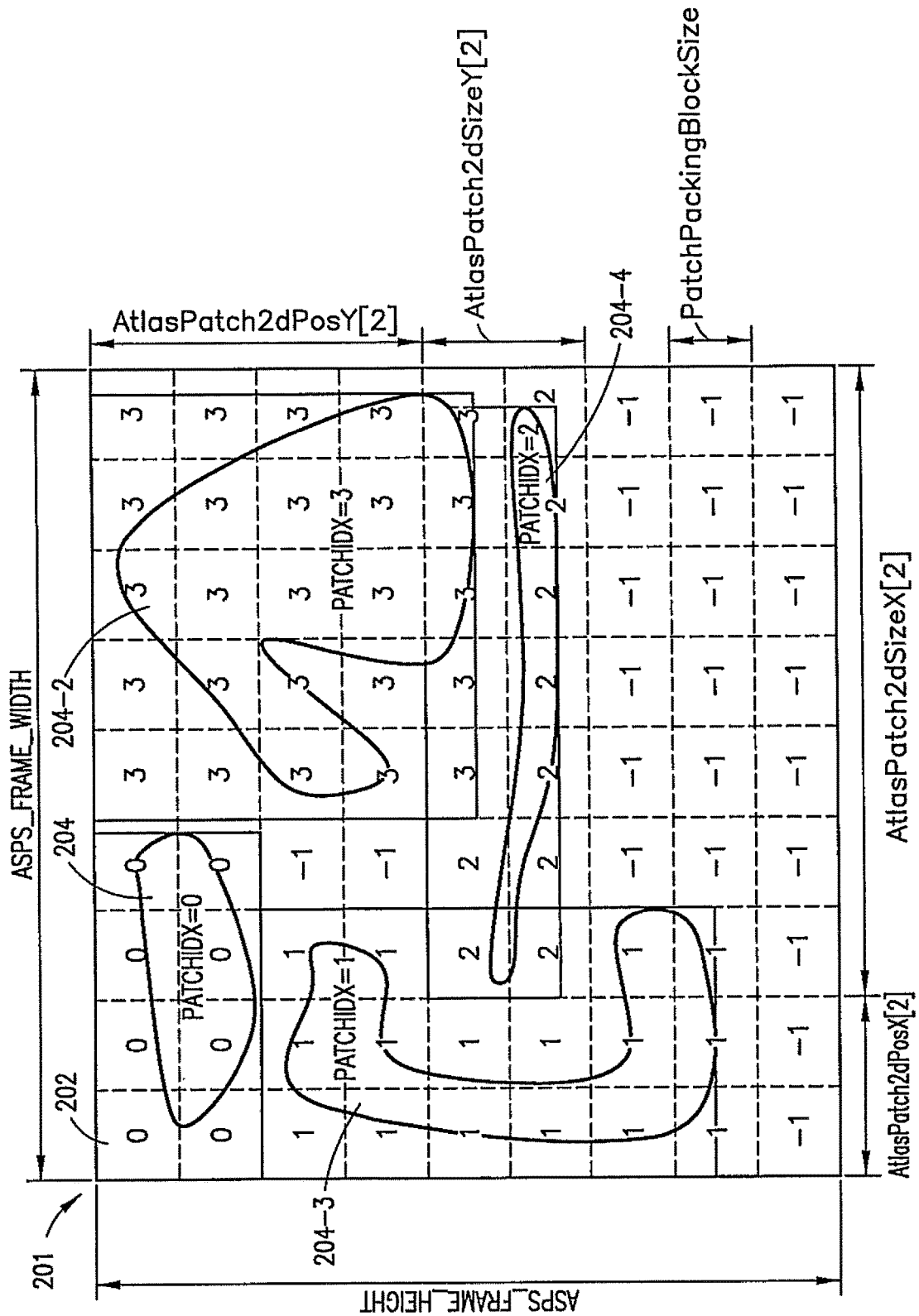
FIG. 2 shows an example of block to patch mapping.

Atlases are partitioned into patch packing blocks of equal size. Refer for example to block 202 in FIG. 2, where FIG. 2 shows an example of block to patch mapping. The 2D bounding boxes of patches and their coding order determine the mapping between the blocks of the atlas image and the patch indices. FIG. 2 shows an example of block to patch mapping with 4 projected patches (204, 204-2, 204-3, 204-4) onto an atlas 201 when asps_patch_precedence_order_flag is equal to 0. Projected points are represented with dark gray. The area that does not contain any projected points is represented with light grey. Patch packing blocks 202 are represented with dashed lines. The number inside each patch packing block 202 represents the patch index of the patch (204, 204-2, 204-3, 204-4) to which it is mapped.

Axes orientations are specified for internal operations. For instance, the origin of the atlas coordinates is located on the top-left corner of the atlas frame. For the reconstruction step, an intermediate axes definition for a local 3D patch coordinate system is used. The 3D local patch coordinate system is then converted to the final target 3D coordinate system using appropriate transformation steps.

Figure 3B:
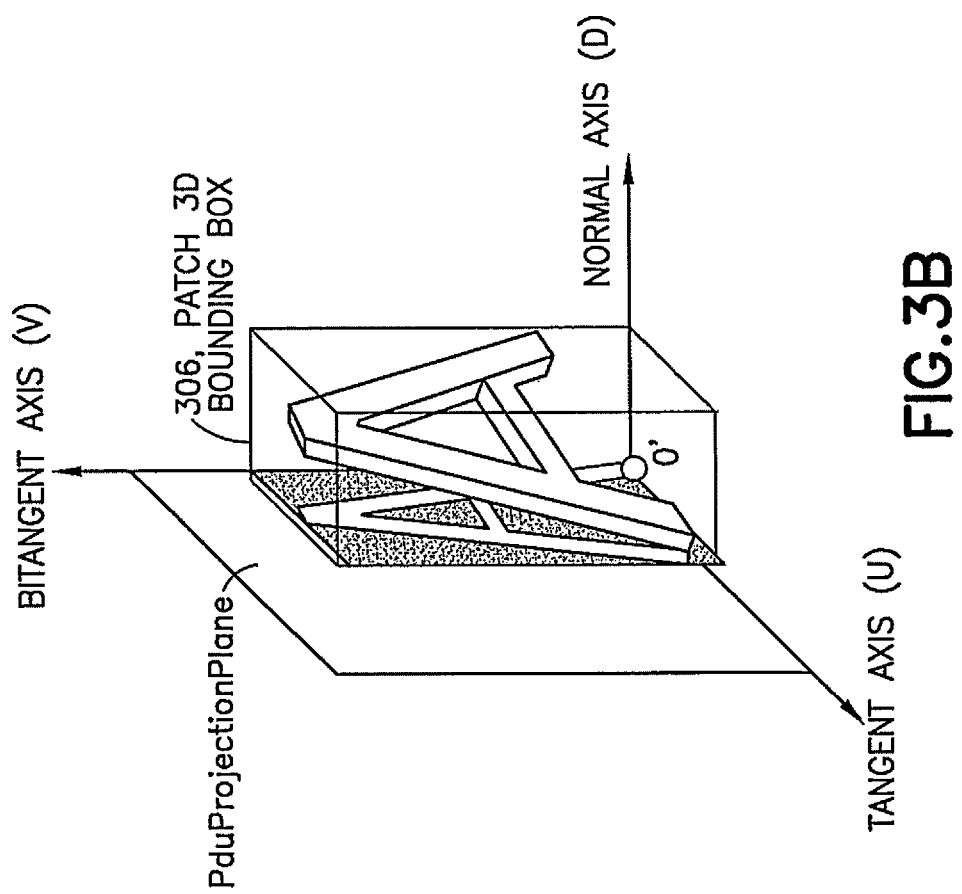
FIG. 3B shows an example of a local 3D patch coordinate system.

FIG. 3A shows an example of an atlas coordinate system, FIG. 3B shows an example of a local 3D patch coordinate system, and FIG. 3C shows an example of a final target 3D coordinate system. Refer to ISO/IEC 23090-5.

FIG. 3A shows an example of a single patch 302 packed onto an atlas image 304. This patch 302 is then converted, with reference to FIG. 3B, to a local 3D patch coordinate system (U, V, D) defined by the projection plane with origin O', tangent (U), bi-tangent (V), and normal (D) axes. For an orthographic projection, the projection plane is equal to the sides of an axis-aligned 3D bounding box 306, as shown in FIG. 3B. The location of the bounding box 306 in the 3D model coordinate system, defined by a left-handed system with axes (X, Y, Z), can be obtained by adding offsets TilePatch3dOffsetU 308, TilePatch3DOffsetV 310, and TilePatch3DOffsetD 312, as illustrated in FIG. 3C.

V3C High Level Syntax

Coded V3C video components are referred to herein as video bitstreams, while an atlas component is referred to as the atlas bitstream. Video bitstreams and atlas bitstreams may be further split into smaller units, referred to herein as video and atlas_sub_bitstreams, respectively, and may be interleaved together, after the addition of appropriate delimiters, to construct a V3C bitstream.

V3C patch information is contained in an atlas bitstream, atlas_sub_bitstream( ), which contains a sequence of NAL units. A NAL unit is specified to format data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and sample streams is identical except that in the sample stream format specified in Annex D of ISO/IEC 23090-5 each NAL unit can be preceded by an additional element that specifies the size of the NAL unit.

NAL units in an atlas bitstream can be divided into atlas coding layer (ACL) and non-atlas coding layer (non-ACL) units. The former is dedicated to carry patch data, while the latter is dedicated to carry data necessary to properly parse the ACL units or any additional auxiliary data.

In the nal_unit_header( ) syntax nal_unit_type specifies the type of the RBSP data structure contained in the NAL unit as specified in Table 4 of ISO/IEC 23090-5. nal_layer_id specifies the identifier of the layer to which an ACL NAL unit belongs or the identifier of a layer to which a non-ACL NAL unit applies. The value of nal_layer_id shall be in the range of 0 to 62, inclusive. The value of 63 may be specified in the future by ISO/IEC. Decoders conforming to a profile specified in Annex A of ISO/IEC 23090-5 shall ignore (i.e., remove from the bitstream and discard) all NAL units with values of nal_layer_id not equal to 0.

V3C Extension Mechanisms

While designing the V3C specification it was envisaged that amendments or new editions can be created in the future. In order to ensure that the first implementations of V3C decoders are compatible with any future extension, a number of fields for future extensions to parameter sets were reserved.

For example, the second edition of V3C introduced an extension in VPS related to MIV and the packed video component.

```
...
    vps_extension_present_flag                              u(1)
    if( vps_extension_present_flag ) {
        vps_packing_information_present_flag                u(1)
        vps_miv_extension_present_flag                      u(1)
        vps_extension_6bits                                 u(6)
    }
    if( vps_packing_information_present_flag ) {
```

```
    for( k = 0 ; k <= vps_atlas_count_minus1; k++) {
        j = vps_atlas_id[ k ]
        vps_packed_video_present_flag[ j ]
        if( vps_packed_video_present_flag[ j ] )
            packing_information( j )
        }
    }
    if( vps_miv_extension_present_flag )
        vps_miv_extension( ) /*Specified in ISO/IEC 23090-12 (Under
preparation. Stage at time of publication: ISO/IEC CD 23090-12:2020)*/
    if( vps_extension_6bits ) {
        vps_extension_length_minus1                                    ue(v)
        for(j = 0; j < vps_extension_length_minus1 + 1; j++){
            vps_extension_data_byte                                    u(8)
        }
    }
    byte_alignment( )
}
```

Rendering and Meshes

A polygon mesh is a collection of vertices, edges and faces that defines the shape of a polyhedral object in 3D computer graphics and solid modeling. The faces usually consist of triangles (triangle mesh), quadrilaterals (quads), or other simple convex polygons (n-gons), since this simplifies rendering, but may also be more generally composed of concave polygons, or even polygons with holes.

Figure 4:
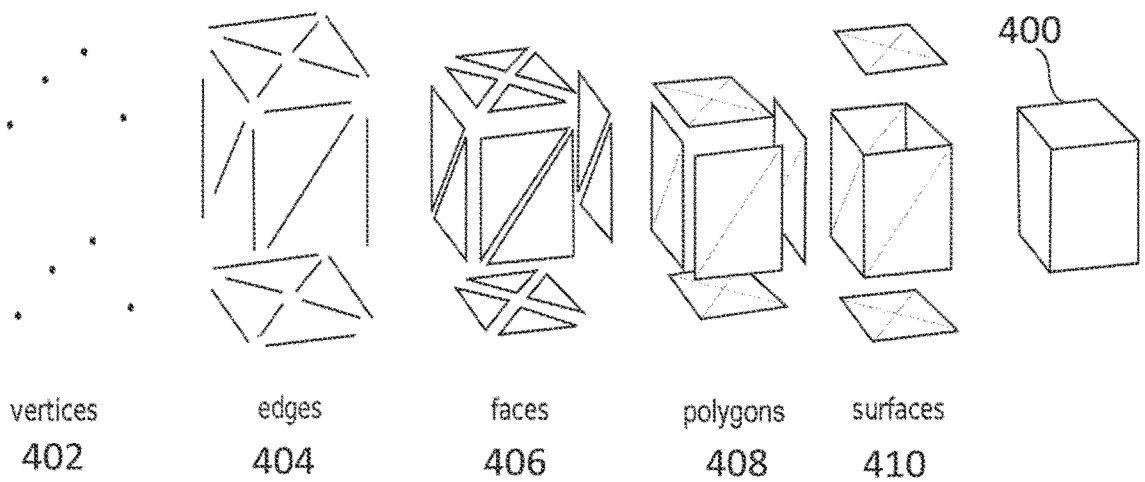
FIG. 4 shows elements of a mesh.

With reference to FIG. 4, objects 400 created with polygon meshes are represented by different types of elements. These include vertices 402, edges 404, faces 406, polygons 408 and surfaces 410 as shown in FIG. 4. Thus, FIG. 4 illustrates elements of a mesh.

Polygon meshes are defined by the following elements:

Vertex (402): a position in 3D space defined as (x,y,z) along with other information such as color (r,g,b), normal vector and texture coordinates.

Edge (404): a connection between two vertices.

Face (406): a closed set of edges 404, in which a triangle face has three edges, and a quad face has four edges. A polygon 408 is a coplanar set of faces 406. In systems that support multi-sided faces, polygons and faces are equivalent. Mathematically a polygonal mesh may be considered an unstructured grid, or undirected graph, with additional properties of geometry, shape and topology.

Surfaces (410): or smoothing groups, are useful, but not required to group smooth regions.

Groups: some mesh formats contain groups, which define separate elements of the mesh, and are useful for determining separate sub-objects for skeletal animation or separate actors for non-skeletal animation.

Materials: defined to allow different portions of the mesh to use different shaders when rendered.

UV coordinates: most mesh formats also support some form of UV coordinates which are a separate 2D representation of the mesh "unfolded" to show what portion of a 2-dimensional texture map to apply to different polygons of the mesh. It is also possible for meshes to contain other such vertex attribute information such as color, tangent vectors, weight maps to control animation, etc. (sometimes also called channels).

V-PCC Mesh Coding Extension (MPEG M49588)

Figure 5:
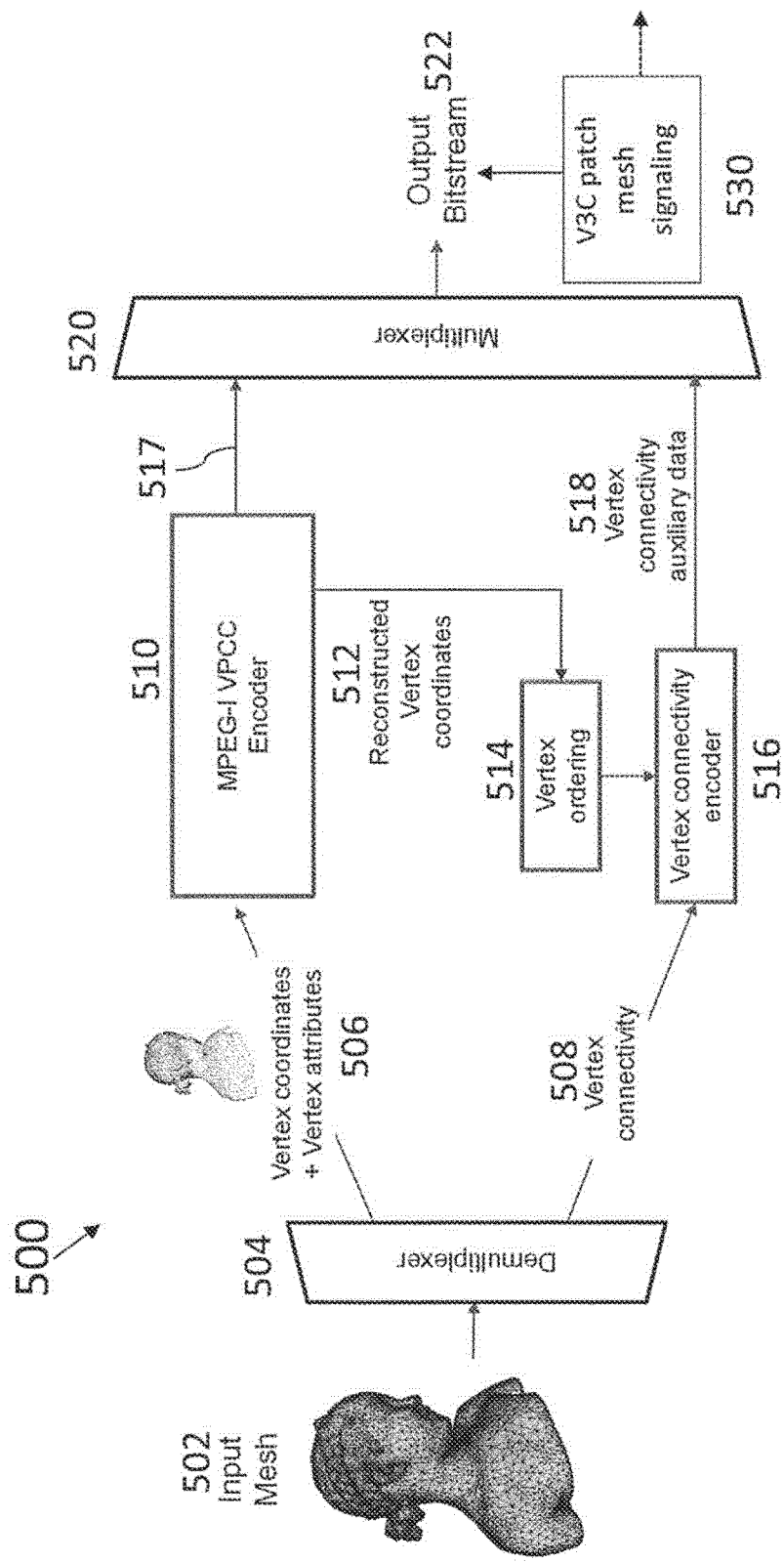
FIG. 5 shows an example V-PCC extension for mesh encoding, based on the embodiments described herein.
Figure 6:
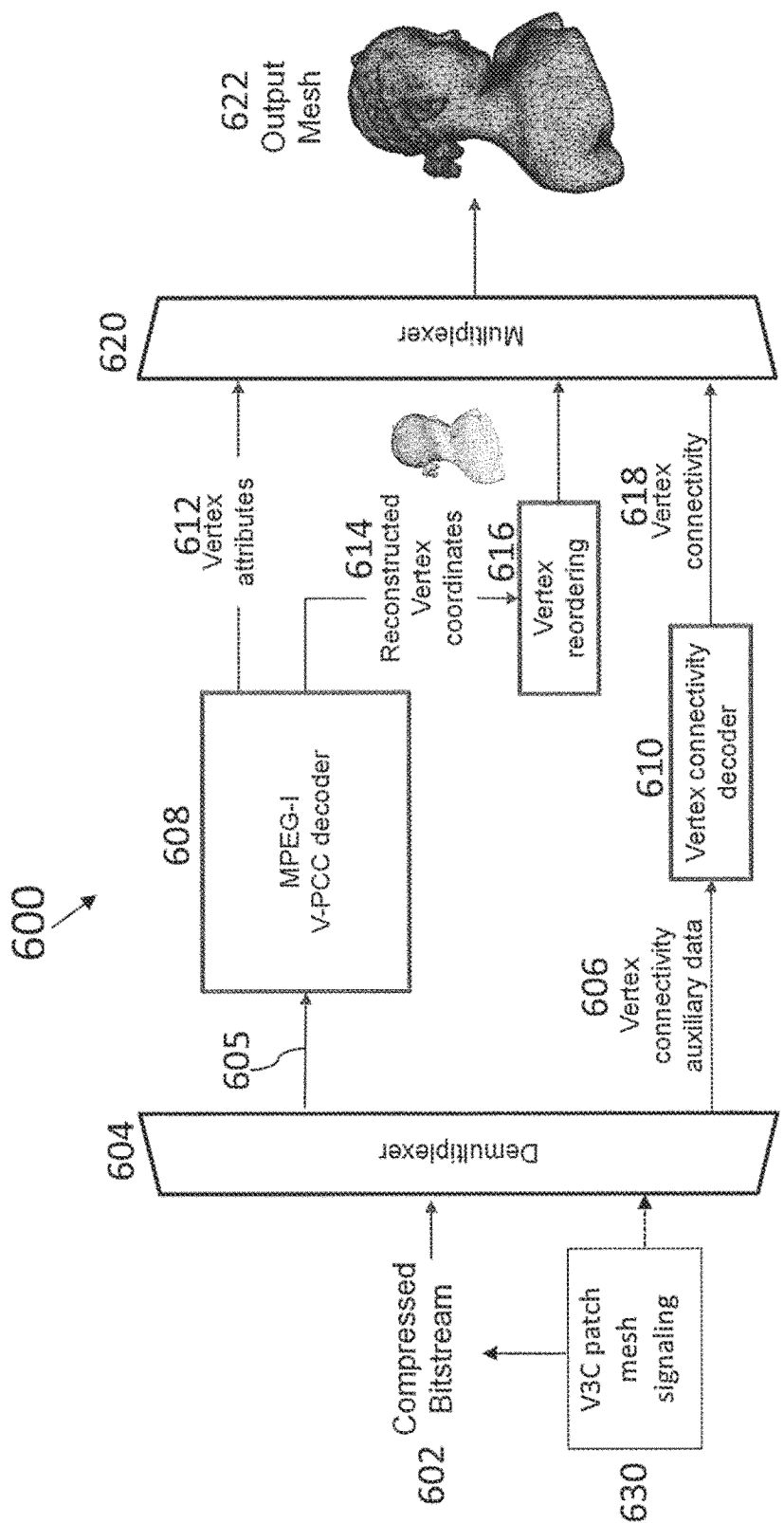
FIG. 6 shows an example V-PCC extension for mesh decoding, based on the embodiments described herein.

FIG. 5 and FIG. 6 show the extensions to the V-PCC encoder and decoder to support mesh encoding and mesh decoding, respectively, as proposed in MPEG input document [MPEG M47608].

In the encoder extension 500, the input mesh data 502 is demultiplexed with demultiplexer 504 into vertex coordinates+attributes 506 and vertex connectivity 508. The vertex coordinates+attributes data 506 is coded using MPEG-I V-PCC (such as with MPEG-I VPCC encoder 510), whereas the vertex connectivity data 508 is coded (using vertex connectivity encoder 516) as auxiliary data 518. Both of these (encoded vertex coordinates and vertex attributes 517 and auxiliary data 518) are multiplexed using multiplexer 520 to create the final compressed output bitstream 522. Vertex ordering 514 is carried out on the reconstructed vertex coordinates 512 at the output of MPEG-I V-PCC 510 to reorder the vertices for optimal vertex connectivity encoding 516.

Based on the examples described herein, as shown in FIG. 5, the encoding process/apparatus 500 of FIG. 5 may be extended such that the encoding process/apparatus 500 signals V3C patch mesh signaling 530 within the output bitstream 522. Alternatively, V3C patch mesh signaling 530 may be provided and signaled separately from the output bitstream 522.

As shown in FIG. 6, in the decoder 600, the input bitstream 602 is demultiplexed with demultiplexer 604 to generate the compressed bitstreams for vertex coordinates+attributes 605 and vertex connectivity 606. The input/compressed bitstream 602 may comprise or may be the output from the encoder 500, namely the output bitstream 522 of FIG. 5. The vertex coordinates+attributes data 605 is decompressed using MPEG-I V-PCC decoder 608 to generate vertex attributes 612. Vertex ordering 616 is carried out on the reconstructed vertex coordinates 614 at the output of MPEG-I V-PCC decoder 608 to match the vertex order at the encoder 500. The vertex connectivity data 606 is also decompressed using vertex connectivity decoder 610 to generate vertex connectivity information 618, and everything (including vertex attributes 612, the output of vertex reordering 616, and vertex connectivity information 618) is multiplexed with multiplexer 620 to generate the reconstructed mesh 622.

Based on the examples described herein, as shown in FIG. 6, the decoding process/apparatus 600 of FIG. 6 may be extended such that the decoding process/apparatus 600 receives and decodes V3C patch mesh signaling 630, which may be part of the compressed bitstream 602. The V3C patch mesh signaling 630 of FIG. 6 may comprise or correspond to the V3C patch mesh signaling 530 of FIG. 5. Alternatively, V3C patch mesh signaling 630 may be received and signaled separately from the compressed bitstream 602 or output bitstream 522 (e.g. signaled to the demultiplexer 604 separately from the compressed bitstream 602).

Generic Mesh Compression

Mesh data may be compressed directly without projecting it into 2D-planes, like in V-PCC based mesh coding. In fact, the anchor for V-PCC mesh compression call for proposals (CfP) utilizes off-the shelf mesh compression technology, Draco (https://google.github.io/draco/), for compressing mesh data excluding textures. Draco is used to compress vertex positions in 3D, connectivity data (faces) as well as UV coordinates. Additional per-vertex attributes may be also compressed using Draco. The actual UV texture may be compressed using traditional video compression technologies, such as H.265 or H.264.

Draco uses the edgebreaker algorithm at its core to compress 3D mesh information. Draco offers a good balance between simplicity and efficiency, and is part of Khronos endorsed extensions for the glTF specification. The main idea of the algorithm is to traverse mesh triangles in a deterministic way so that each new triangle is encoded next to an already encoded triangle. This enables prediction of vertex specific information from the previously encoded data by simply adding delta to the previous data. Edgebreaker utilizes symbols to signal how each new triangle is connected to the previously encoded part of the mesh. Connecting triangles in such a way results on average in 1 to 2 bits per triangle when combined with existing binary encoding techniques.

MPEG 3DG (ISO/IEC SC29 WG7) has issued a call for proposal (CfP) on integration of MESH compression into the V3C family of standards (ISO/IEC 23090-5). During the work on a CfP response owned by the Applicant of the instant disclosure, the Applicant has identified that straight-forward regular meshing of V3C patches from depth maps (geometry component) is generating meshes with too many faces 752 and vertices 753 compared to the original encoded mesh, sometimes up to ten times the number of faces 752, an example is shown on FIG. 7B. A high number of faces leads to very slow processing at the decoder and rendering side, and a very large memory footprint that the original mesh would not cause.

Therefore, there is a need for a remeshing approach that keeps the quality of the decoded depth map but outputs a connectivity that is closer to the original mesh, i.e. reduces the number of vertices and faces. The V3C standard does not allow to represent triangles or vertices, hence there is a need to recreate the triangles and vertices at the decoder. For that assistance is provided by the encoder, where the encoder sends additional signaling which assists the decoder to remesh faster with higher quality.

Figures 8A, 8B:
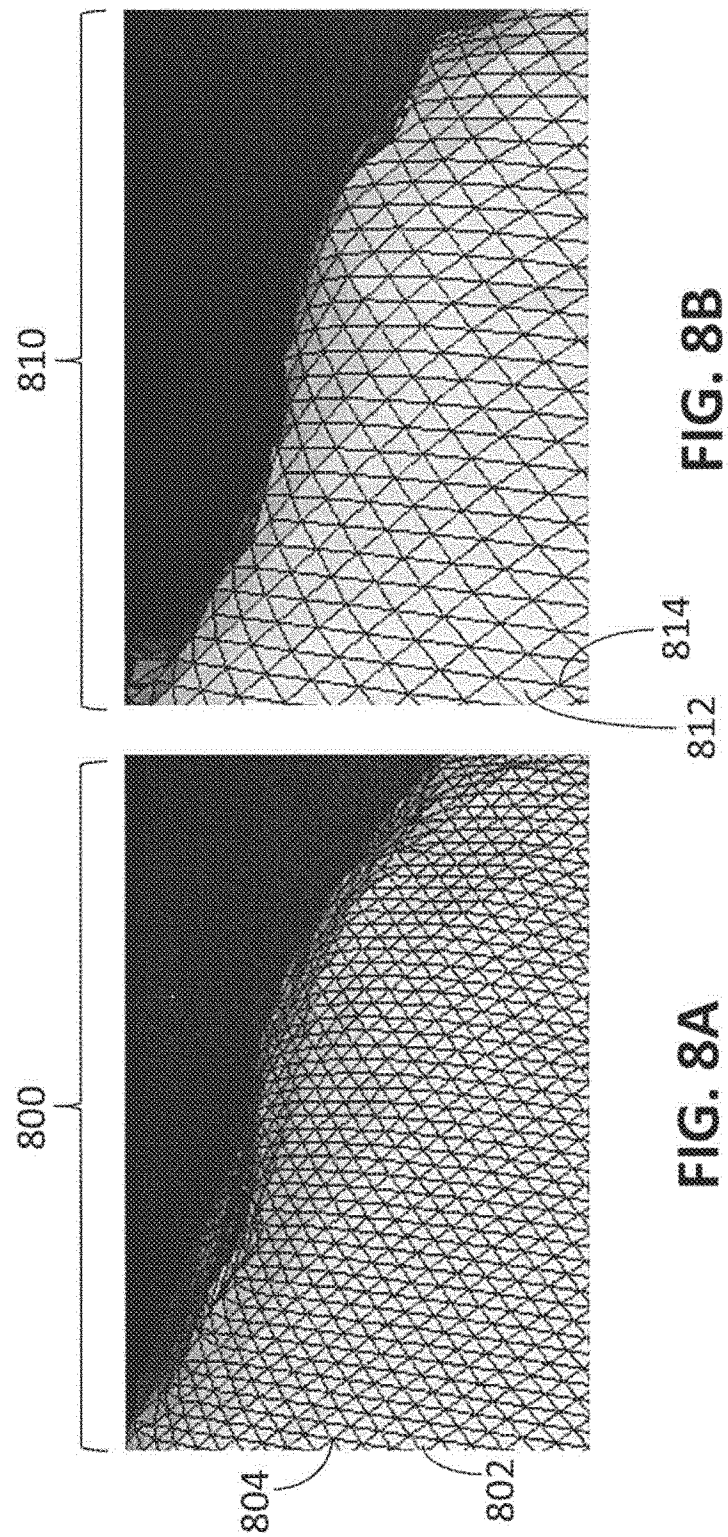
FIG. 8A shows regular meshing of a V3C patch.
FIG. 8B shows simple subsampling of a V3C patch.

Simple subsampling of the patch depth map (geometry component) may lead to poor geometry quality as represented in FIG. 8B.

The objective is to construct a triangulation of the depth map (geometry component) with i) a minimal number of triangles, ii) triangles with non-degenerate shapes, with a consistently oriented normal, iii) triangles that do not cover unoccupied depth map (geometry component) pixels, iv) vertices that capture well the salient points of the depth map (local maxima and minima), and v) patch borders that are reconstructed with a quality that can be parameterized by the encoder.

Furthermore, the triangulation should support a level-of-detail and/or multi-resolution that is adaptive to the depth map (geometry component), and the triangulation process should be fast and parallelizable.

Accordingly, FIG. 7A shows a patch depth map (geometry component) 700 with unoccupied pixels (e.g. 702) represented as dashed circles. FIG. 7B shows the straightforward regular triangulation 750 of occupied (valid) pixels of the same depth map (geometry component) 700. FIG. 7B shows the regions (760, 762, 764, 766, 768, 770, 772) of the depth map 700 where there are unoccupied pixels 702 within the depth map 700.

FIG. 8A shows a regular meshing 800 of a V3C patch, and FIG. 8B shows simple subsampling 810 of the V3C patch. It can be seen in FIG. 8B that the number of triangles (e.g. number of 812 compared to number of 802) and vertices (number of 814 compared to number of 804) was reduced but with a loss of quality of the geometry; the result 810 shown in FIG. 8B misses some of the shape features and is generally less smooth than the meshing 800 in FIG. 8A and even causes some visible distortions.

Currently signaling related to the preferred triangulation method and related parameters are missing. Thus, signaling related to the preferred triangulation method and related parameters are described herein.

A lot of research has been done by the computer graphics community on the area of remeshing. For example mesh simplification (also known as decimation) such as mesh simplification based on Quadric Error Metrics (QEMs) to e.g. simplify surfaces with color and texture, or progressive meshes has been introduced. These approaches and most of those based on them rely on a priority queue of edges to be collapsed (or vertices) with costs that depend on some metric computed based on the edge or vertex neighborhood. The process is iterative and costs need to be re-updated for all edges/vertices for which a neighboring edge or vertex has been collapsed or decimated.

Furthermore, despite the fact some of these approaches, such as those based on QEMs, take into account the attributes and not only geometry for the cost estimations, the computational cost increases for limited enhanced quality, for example when using a quadric metric for simplifying meshes with appearance attributes.

Wavelet decompositions is another approach to remesh meshes in a hierarchical representation including filters, such as normal meshes, but the complexity of the approach and the limited compression gains have not enabled these approaches to be used in recent compression frameworks such as the current de facto state-of-the art Draco, that is based on an edgebreaker algorithm (e.g. for connectivity compression for triangle meshes), without any hierarchical or simplification tool. There were also no extensions of the wavelet frameworks to dynamic meshes, but rather a focus on static meshes.

These approaches also do not take into account the nature of V3C patches, that have a depth map (geometry component) with possibly unoccupied pixels and that represent a projection and rasterization of a 3D mesh patch.

Disclosed herein is a method to remesh V3C patches in a way that can be parameterized by the encoder and provided to a decoder in or along a V3C bitstream as a level-of-detail or other types of signaling that are explicitly described hereafter.

The remeshing algorithm is performed in several steps that can all be processed in parallel at a depth map (geometry component) block of pixels or pixel level. The algorithm is designed to preserve the geometry characteristics by sampling salient points, and to guarantee that non-degenerate triangles can be regenerated from the encoded patches.

Furthermore, the algorithm produces regions with coarser sampling when the geometry does not present salient features (planar region or smooth curvature region) and regions with finer sampling close to patch borders and on regions where curvature presents several salient points (e.g. topological salient pixels of the curvature field of the shape such as umbilical points).

The approach is numerically efficient as each step exhibits a high level of data processing parallelism and such that the approach processes data from coarse to fine granularity at the boarders of the patches. When high resolution patches need to be remeshed, the remeshing process at each step accesses a subset of pixels of the depth map (geometry component) by resampling or defining small local regions (working groups) for processing; no processing is applied in the full resolution depth map as a whole at any moment.

The herein described approach can lead to decreased quality compared to fine-to-coarse approaches, such as mesh simplification, however, the computational complexity is much lower with higher data parallelism, and well-shaped triangles are guaranteed by construction, which makes the herein described method a good alternative for devices with limited computational capability.

Accordingly, disclosed herein is a method for performing optimization of the remeshing procedure at the encoder side, deriving values for optimized remeshing parameters, providing the encoded mesh as a bitstream along with the optimized parameters to a decoder, and reconstructing the mesh from the provided bitstream utilizing the optimized parameters.

On the decoder side the remeshing is performed based on the provided optimized signaling information, e.g. through the patch data unit (pdu) syntax structure for each patch in a V3C bitstream. In one embodiment, a method that reconstructs a triangulation of the patch based on level-of-detail syntax element is provided; when pdu_lod_enabled_flag evaluates as true, pdu_lod_scale_x_minus1 and pdu_lod_scale_y_idc are used to define a target sampling of the patch mesh.

In the first embodiment, the subsampling factor is governed by the LOD information present in the V3C patch data unit syntax element. The remeshing process consists of the following items (1-6 immediately following).

1. Subsampling:
   subsample the depth map (geometry component) pixels at occupied positions (see FIG. 12A and FIG. 12B).
   a) Optionally with filtering
      Filtering can include Laplacian or Gaussian pyramids, DWT, low-pass filters etc. that can avoid aliasing issues in this coarse resampling. Such filters should ideally be occupancy-aware; in other words, such filters should be able to discard depth (geometry) values that are not valid.
   b) Optionally select one of the nearest occupied pixels (increases the computational cost)

2. Local Optimization: (see FIG. 13A and FIG. 13B)
   detect salient points in a local window and use them rather than the first regular subsampled pixel positions. Such salient points can be defined as (in increasing order of computational complexity):
   a) Local extrema, i.e. local minimum or maximum of the valid depth (geometry) pixels; detecting such pixels is computationally efficient and they enable the method to better capture the range of the depth (geometry) signal.
   b) singularities of the curvature flow: umbilical points, these points are defined such that principal curvatures are equal at these points. While they are not discriminative for planes or smooth simple surfaces such as quadrics, umbilical points of shapes that exhibit more variety in curvature are located at the intersection of the shape curvature principal directions vector field separatrices (lines that separate portions of the shape that have homogeneous curvature flow), which are good candidates for adding vertices in a remeshing process.
   c) points on seams of the texture coordinates or edges of the texture pixels; adding such points ensure a higher quality interpolation of the texture signal once the geometry is remeshed. Such detection may not be complex but the texture component resolution may be higher than the one of the geometry components.
   d) any combination of the aforementioned points.
   The local window is centered on the subsampled pixel and its size depends on the subsampling factor such that local windows do not overlap and ideally, that a pixel column or row separates them. This ensures well shaped triangles (Poisson disk around vertices by construction).

3. Triangulate Salient Points (see FIG. 14A and FIG. 14B)
   if no salient points are detected, the center of the region is kept instead.

4. Occupancy-Based Correction: (see FIG. 15A and FIG. 15B)
   detect triangles that are overlapping unoccupied pixels and split them until no unoccupied pixel is covered. This process is iterative and a tradeoff can be set by the encoder between quality and number of iterations performed to ensure no coverage of invalid pixels.

5. Refine Contours (see FIG. 16A and FIG. 16B)
   iterative triangle refinement by adding pixel samples to cover N percent of contour pixels. This iterative process can as well be parameterized by the encoder to reach a desired tradeoff between processing speed and final remeshing quality.

6. Mesh Optimization:
   a) optionally flip edges to maximize geometry smoothness
   b) optionally smooth the resulting mesh In one embodiment the signaling information related to the algorithm item 1 subsampling operation is provided through the pdu_lod_scale_x_minus1 and pdu_lod_scale_y_idc syntax element whose semantics are redefined based on the values in the V3C parameter set such as ptl_profile_toolset_idc that indicates the mesh coding or based on an atlas sequence/frame parameter set flag, e.g. asps_mesh_extension_flag or afps_mesh_extension_flag that marks the presence of mesh based syntax elements as presented below and in FIG. 9 (refer to items 920 and 922).

| atlas_sequence_parameter_set_rbsp( ) { | Descriptor |
|---|---|
| ... | |
| asps_extension_present_flag | u(1) |
| If (asps_extension_present_flag ){ | |
| ... | |

| atlas_sequence_parameter_set_rbsp( ) { | Descriptor |
|---|---|
|     asps_mesh_extension_present_flag | u(1) |
|     ... | |
| } | |
| if( asps_vpcc_extension_present_flag ) | |
|     asps_vpcc_extension( ) /* Specified in Annex H */ | |
| if( asps_miv_extension_present_flag ) | |
|     asps_miv_extension( ) /* Specified in ISO/IEC 23090-12 */ | |
| if( asps_mesh_extension_present_flag ) | |
|     asps_mesh_extension( ) | |
| if( asps_extension_5bits ) | |
|     while( more_rbsp_data( ) ) | |
|         asps_extension_data_flag | u(1) |
| rbsp_trailing_bits( ) | |
| } | |
| } | |

| asps_mesh_extension( ) { | Descriptor |
|---|---|
|     ... | |
|     asps_lod_subsampling_enable_flag | u(1) |
|     ... | |
| } | | asps_lod_subsampling_enable_flag equal to 1 indicates that afps_lod_mode_enabled_flag syntax element shall be equal to 1 and that values of pdu_lod_scale_x_minus1 and pdulodscaleyidc should be interpreted according to the algorithm presented in the examples described herein.

In one embodiment the signaling information related to the algorithm item 1 filtering operation is provided to the decoder through a Supplemental Enhancement Information Message.

| mesh_reconstruction_info( payloadSize ) { | Descriptor |
|---|---|
|     ... | |
|     mri_remeshing_type | u(8) |
|     ... | |
| } | | mriremeshingtype indicating the value of subsampling filtering. mriremeshingtype equal to 0 signals Gaussian pyramids, equal to 1 signals DWT multiresolution, equal to 2 FIR filter. Values from 3 . . . 255 can provide another types.

In one embodiment the signaling information related to the algorithm item 1 filtering operation is provided to the decoder through a syntax element in the atlas sequence/frame parameter set, for example through an extension in ASPS:

| asps_mesh_extension( ) { | Descriptor |
|---|---|
|     ... | |
|     asps_remeshing_type | u(1) |
|     ... | |
| } | | asps_remeshing_type semantics has the same semantics as mri remeshing type in above embodiment.

In one embodiment the signaling information related to the algorithm item 2 local search window size is provided in an extension to the patch data unit syntax element defined in ISO/IEC 23090-5: 8.3.7.3. Refer to FIG. 10 (items 1002 and 1004) and below.

| patch_data_unit( tileID, patchIdx ) { | Descriptor |
|---|---|
|     pdu_2d_pos_x[ tileID ][ patchIdx ] | ue(v) |
|     pdu_2d_pos_y[ tileID ][ patchIdx ] | ue(v) |
|     pdu_2d_size_x_minus1[ tileID ][ patchIdx ] | ue(v) |
|     pdu_2d_size_y_minus1[ tileID ][ patchIdx ] | ue(v) |
|     pdu_3d_offset_u[ tileID ][ patchIdx ] | u(v) |
|     pdu_3d_offset_v[ tileID ][ patchIdx ] | u(v) |
|     pdu_3d_offset_d[ tileID ][ patchIdx ] | u(v) |
|     if( asps_normal_axis_max_delta_value_enabled_flag ) | |
|         pdu_3d_range_d[ tileID ][ patchIdx ] | u(v) |
|     pdu_projection_id[ tileID ][ patchIdx ] | u(v) |
|     pdu_orientation_index[ tileID ][ patchIdx ] | u(v) |
|     if( afps_lod_mode_enabled_flag ) { | |
|         pdu_lod_enabled_flag[ tileID ][ patchIdx ] | u(1) |
|         if( pdu_lod_enabled_flag[ tileID ][ patchIdx ]) { | |
|             pdu_lod_scale_x_minus1[ tileID ][ patchIdx ] | ue(v) |
|             pdu_lod_scale_y_idc[ tileID ][ patchIdx ] | ue(v) |
|         } | |
|     } | |
|     if( asps_plr_enabled_flag ) | |
|         plr_data( tileID, patchIdx ) | |
|     if( asps_miv_extension_present_flag ) | |
|         pdu_miv_extension( tileID, patchIdx ) /* Specified in ISO/IEC 23090-12 */ | |
|     if( asps_mesh_extension_present_flag ) | |
|         pdu_mesh_extension( tileID, patchIdx ) | |
| } | |

| pdu_mesh_extension ( tileID, patchIdx ) { | Descriptor |
|---|---|
|     if(asps_remeshing_enable_flag == 1) { | |
|         pdu_remeshing_enable_flag [ tileID ][ patchIdx ] | |
|         If(pdu_remeshing_enable_flag [ tileID ][ patchIdx] == 1) { | |

```
pdu_mesh_extension ( tileID, patchIdx ) {                                    Descriptor
    pdu_remeshing_local_window_size_x[ tileID ][ patchIdx ]                  ue(v)
    pdu_remeshing_local_window_size_y[ tileID ][ patchIdx ]                  ue(v)
   }
  }
}
``` pdu_remeshing_local_window_size_x [tileID][p] indicates the local optimization window size in the x-direction centered at a point in a patch with index p of the current atlas tile, with tile ID equal to tileID, prior to its addition to the patch coordinate TilePatch3dOffsetV[tileID]

pdu_remeshing_local_window_size_y [tileID][p] indicates the local optimization window size in the y-direction centered at a point in a patch with index p of the current atlas tile, with tile ID equal to tileID, prior to its addition to the patch coordinate TilePatch3dOffsetV[tileID][p].

In one embodiment the signaling information related to the algorithm item 2 salient point type is provided to the decoder through a Supplemental Enhancement Information Message:

```
mesh_reconstruction_info( payloadSize ) {                Descriptor
    ...
    mri_geometry_min                                     u(1)
    mri_geometry_max                                     u(1)
    mri_curvature_singular_points                        u(1)
    mri_texture_coordinate_singular_points               u(1)
    mri_texture_feature_points                           u(1)
    ...
  }
``` mri_geometry_min equal to 1 indicates that the minimum depth value position should be used as the salient point in the local remeshing window during the reconstruction process on the decoder.

mri_geometry_max equal to 1 indicates that the maximum depth value position should be used as the salient point in the local remeshing window during the reconstruction process on the decoder.

mri_curvature_singular_points equal to 1 indicates the depth (geometry component) curvature singular positions should be detected at the decoder and used during the reconstruction process.

mri_texture_coordinate_singular_points equal to 1 indicates that texture coordinates singular value positions should be calculated at the decoder and used during the reconstruction process.

mri_texture_feature_points equal to 1 indicates the attribute component (color) feature point positions should be used at the decoder for the reconstruction process.

The decoder can be based on the signaled preferred mesh reconstruction information to select the preferred type of salient points, or combination thereof, for the remeshing method. When not signaled, the decoder can default to an implementation specific remeshing method.

In one embodiment the signaling information related to the algorithm item 2 salient point type is provided to the decoder through a syntax element in the atlas sequence/frame parameter set, e.g. as part of the asps_mesh_extension( ) syntax structure.

In one embodiment the signaling information related to the algorithm item 2 salient point type is provided to the decoder through ACL NAL units as a new patch type that provides general information to all patches within a given tile to frame basis. Refer to FIG. 11 (items 1102 and 1104) and below.

```
patch_information_data( tileID, patchIdx, patchMode ) {      Descriptor
    if( ath_type == P_TILE) {
       if( patchMode == P_SKIP )
          skip_patch_data_unit( )
       else if( patchMode == P_MERGE )
          merge_patch_data_unit( tileID, patchIdx )
       else if( patchMode == P_INTRA )
          patch_data_unit( tileID, patchIdx )
       else if( patchMode == P_INTER )
          inter_patch_data_unit( tileID, patchIdx )
       else if( patchMode == P_RAW )
          raw_patch_data_unit( tileID, patchIdx )
       else if( patchMode == P_EOM )
          eom_patch_data_unit( tileID, patchIdx )
       else if( patchMode == P_ALL_PACHES_INFO)
          api_patch_data_unit( tileID, patchIdx )
    }
    else if( ath_type == I_TILE) {
       if( patchMode == I_INTRA )
          patch_data_unit( tileID, patchIdx )
       else if( patchMode == I_RAW)
          raw_patch data_unit( tileID, patchIdx )
       else if( patchMode == I_EOM )
          eom_patch_data_unit( tileID, patchIdx )
       else if( patchMode == P_ALL_PACHES_INFO )
          api_patch_data_unit( tileID, patchIdx )
    }
}
```

```
api_patch_data_unit(tileID, patchIdx ) {                 Descriptor
    ...
  }
```

Syntax structure and semantics of syntax elements of api_patch_data_unit( ) are the same as mesh reconstruction info( ).

In one embodiment the signaling information related to the algorithm item 5 related to contour refinement is provided to the decoder through a Supplemental Enhancement Information Message:

```
mesh_reconstruction_info( payloadSize ) {                Descriptor
    ...
    mri_patch_count_minus1                               u(16)
    for (i = 0; i <mri_patch_count_minus1 + 1; i++){
       mri_countour_percentage[ i ]                      u(8)
       mri_max_num_iteration[ i ]                        u(8)
    }
    ...
  }
``` mri_countour_percentage [i] indicate the percentage of contour pixel in a patch i. The percentage is achieved by multiplying the value by 100/255.

mri_max_num_iteration indicates the maximum iteration during the reconstruction process for patch i.

In one embodiment the signaling information related to the algorithm item 5 filtering operation is provided to decoder through a syntax element in the atlas sequence/frame parameter set, e.g. as part of the asps_mesh_extension( ) syntax structure.

In one embodiment the signaling information related to the algorithm item 5 filtering operation is provided to the decoder through the pdu_mesh_extension( ) of the patch data unit syntax element.

In one embodiment the signaling information related to the algorithm item 6 related to mesh optimization is provided to the decoder through a Supplemental Enhancement Information Message:

| mesh_reconstruction_info( payloadSize ) { | Descriptor |
|---|---|
| ... | |
| mri_max_edge_flips | u(8) |
| mri_smoothing_iter | u(8) |
| ... | |
| } | | mri_max_edge_flips indicates the maximal number of allowed edge flips.

mri_smoothing_iter indicates Laplacian smoothing iterations.

In one embodiment the signaling information related to the algorithm item 6 related to mesh optimization is provided to the decoder through a syntax element in the atlas sequence/frame parameter set, e.g. as part of the asps mesh extension( ) syntax structure.

Figures 12A, 12B:
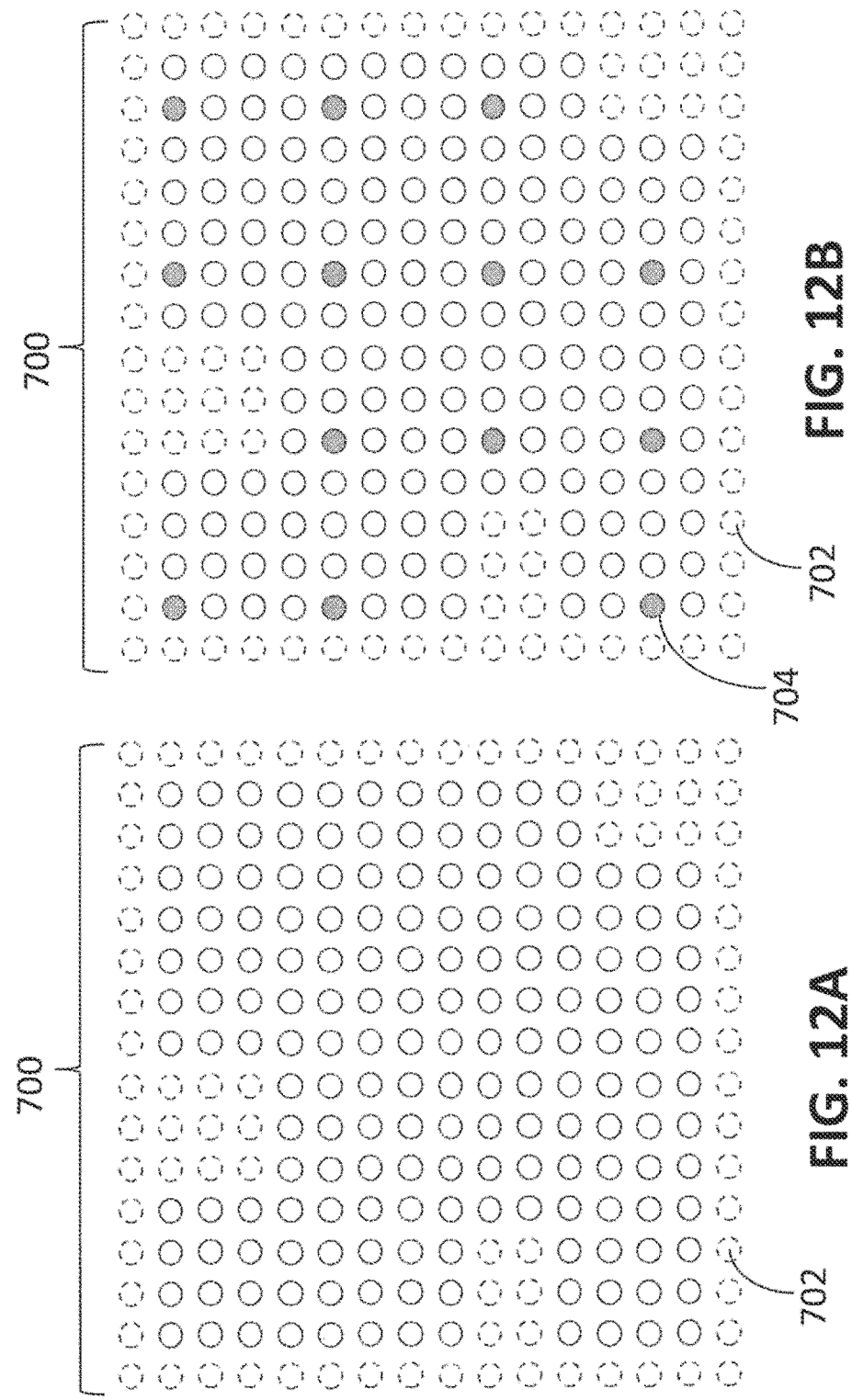
FIG. 12A shows the V3C patch depth map (geometry component) represented with dotted circles on invalid/unoccupied pixels.
FIG. 12B shows a subsampling of the depth map (geometry component) that is signaled in the V3C bitstream.

FIG. 12A shows the V3C patch depth map (geometry component) 700 represented with dotted circles (e.g. 702) on invalid/unoccupied pixels. FIG. 12B shows a subsampling (refer to item 704 and other shaded pixels) of the depth map (geometry component) 700 that is signaled in the V3C bitstream for example by pdu_lod_scale_x_minus1 and pdu_lod_scale_y_idc for the x and y axis sampling rate, respectively.

FIG. 13A and FIG. 13B show local optimization. In FIG. 13A, around each subsampled position, a search window (e.g. 706) is defined based on the sampling factor chosen. In FIG. 13B, a salient point (e.g. 708) is selected in the search window 706. This salient point can be an extrema of depth values or any singular point of the curvature such as umbilical points. The size of the search windows is important as the search windows should not overlap and preferably have one raw or column of pixels in between them. This way, the selected pixels can form a well-shaped triangulation as by construction a Poisson disk surrounds each chosen pixel without including any other chosen pixel.

Figures 14A, 14B:
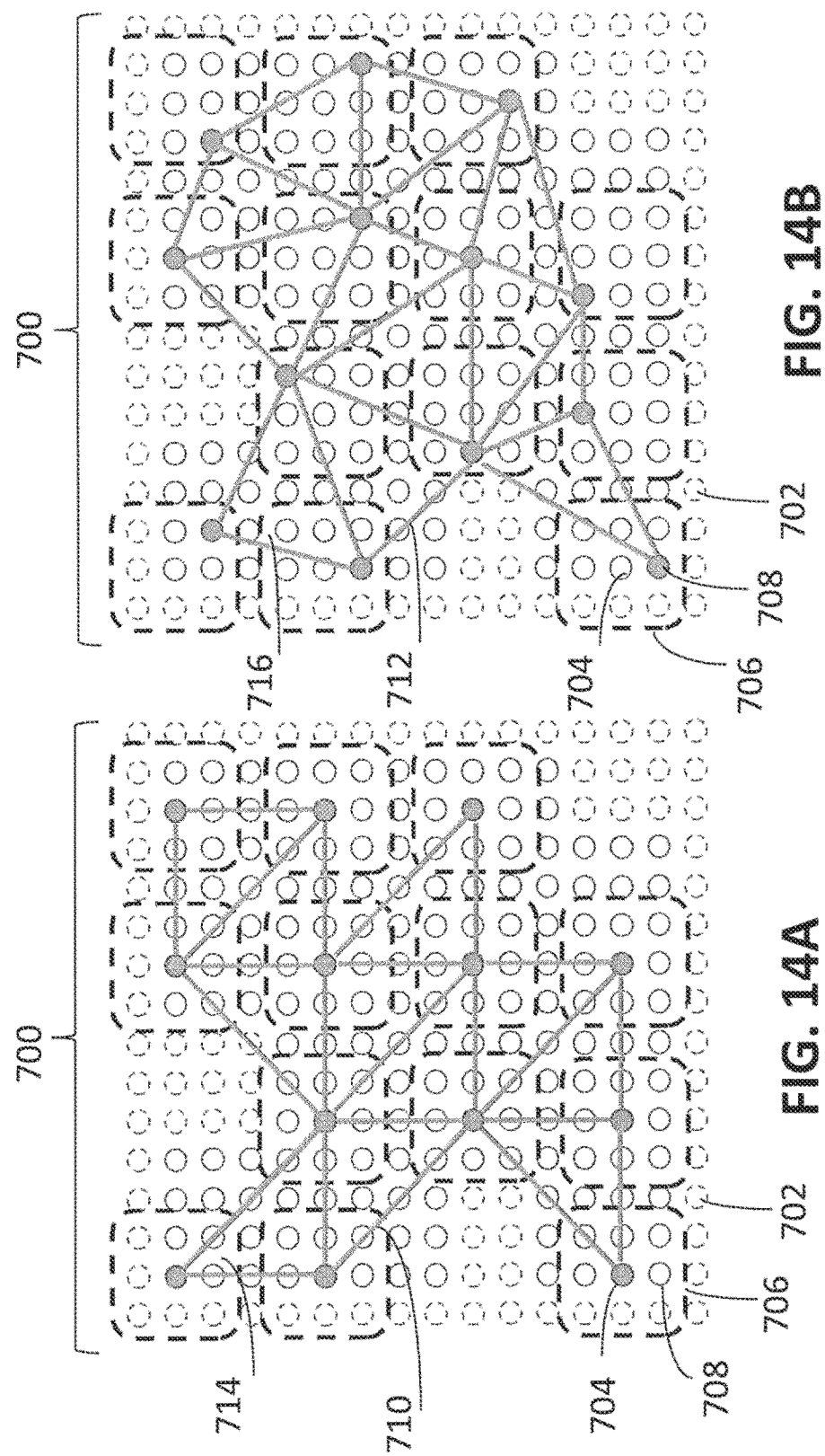
FIG. 14A shows a resulting mesh when no local optimization is performed.
FIG. 14B shows the resulting triangulation after local optimization.

FIG. 14A shows the resulting mesh 710 when no local optimization is performed. FIG. 14B shows the resulting triangulation 712 after local optimization. Despite that the mesh 712 in FIG. 14B may look less regular in 2D then the triangulation 710 shown in FIG. 14A, the mesh 712 in FIG. 14B actually better approximates the 3D shape than the regular triangulation 710 in FIG. 14A. Triangle shapes (714, 716) are non-degenerated in both cases thanks to the sampling rate and local search window size.

FIG. 15A and FIG. 15B show non-coverage of unoccupied pixels (e.g. 702). In FIG. 15A, edges (720, 722) are represented for two triangles (724, 726) that overlap unoccupied pixels (725, 727) in their vicinity. Such triangles (724, 726) would create very visible artifacts. In FIG. 15B, the process of triangle correction based on occupancy shows that a new pixel (728, 730) is sampled close to the triangle edge such that it can create two new triangles (732, 734, 736, 738) that do not overlap non-occupied pixels but still generate a valid triangulation (including with edges 731, 733, 735, 737, 739, 741).

Figures 16A, 16B:
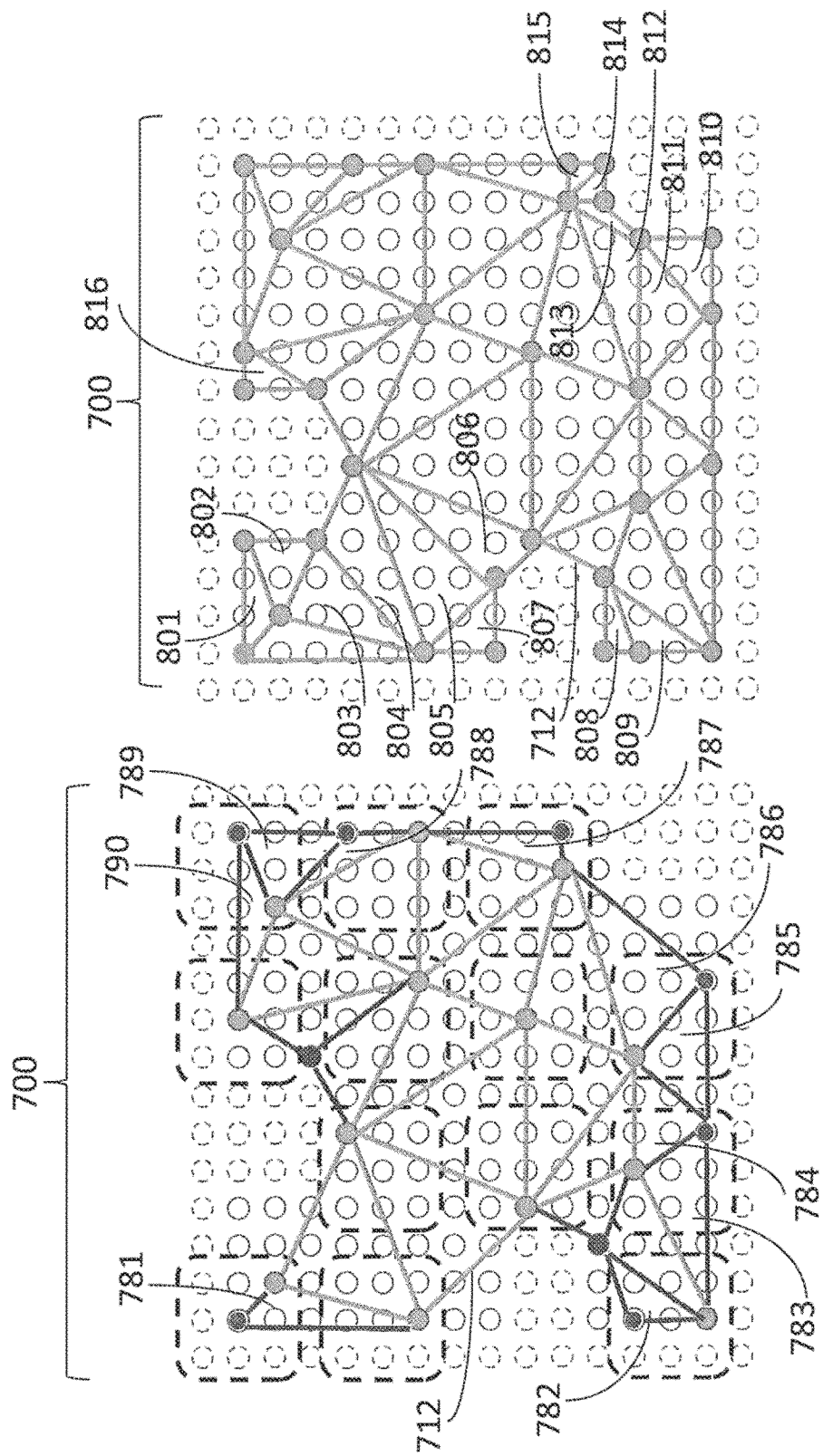
FIG. 16A shows a refinement step, where additional samples and triangles are added close to the borders.
FIG. 16B shows a refinement step, with the resulting mesh with larger triangles in the core of the patch and finer triangles close to the boundaries.

FIG. 16A and FIG. 16B show the refinement step. In FIG. 16A, additional samples and triangles (refer to newly added triangles 781, 782, 783, 784, 785, 786, 787, 788, 789, 790) are added close to the borders. The number of these additional triangles is based on attempting to better capture the border with higher accuracy. FIG. 16B shows the resulting mesh 712 with larger triangles (803, 804, 805, 806) in the core of the patch and finer triangles (801, 802, 807, 808, 809, 810, 811, 812, 813, 814, 815, 816) close to the boundaries. In another embodiment of the method, finer triangles can also be created in the core of the patch, based on the local shape saliency (large triangles for smooth or planar regions and finer triangles for varying curvature areas that require a higher sampling rate). Reference number 712 is maintained through the figures as the mesh changes from the initially generated triangulation 712 after local optimization as in FIG. 14B to the final resulting mesh 712 shown in FIG. 16B.

Ideas herein are to be contributed to standardization in ISO/IEC SC 29 WG7 as part of response to CfP on mesh coding.

Structures and concepts described herein may be included as normative text in a standard.

Figure 17:
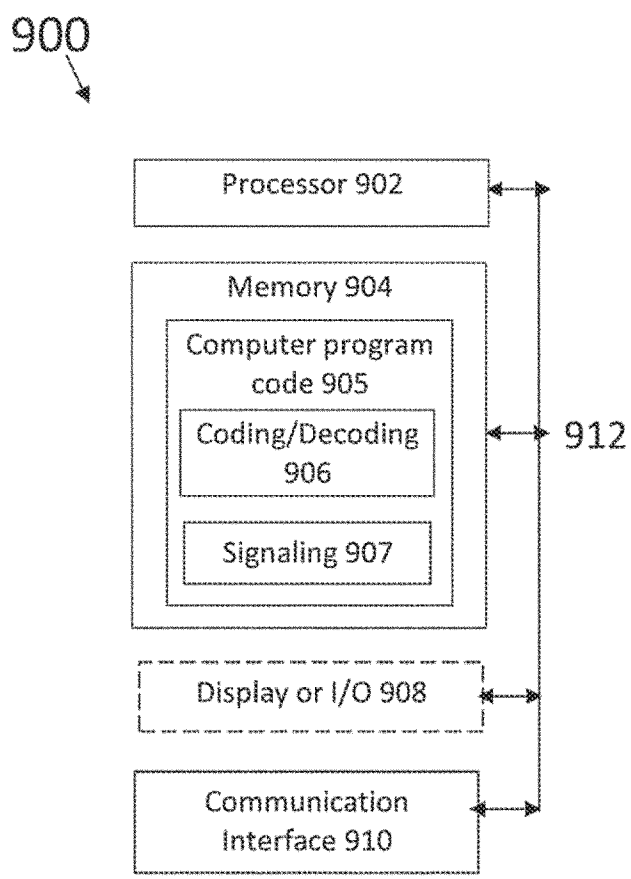
FIG. 17 is an example apparatus to implement V3C patch remeshing for dynamic mesh coding, based on the examples described herein.

FIG. 17 is an apparatus 900 which may be implemented in hardware, configured to implement V3C patch remeshing for dynamic mesh coding, based on any of the examples described herein. The apparatus comprises a processor 902, at least one memory 904 (memory 904 may be transitory or non-transitory) including computer program code 905, wherein the at least one memory 904 and the computer program code 905 are configured to, with the at least one processor 902, cause the apparatus to implement circuitry, a process, component, module, function, coding, and/or decoding (collectively 906) to implement V3C patch remeshing for dynamic mesh coding, based on the examples described herein. The apparatus 900 is further configured to provide or receive signaling 907, based on the signaling embodiments described herein. The apparatus 900 optionally includes a display and/or I/O interface 908 that may be used to display an output (e.g., an image or volumetric video) of a result of coding/decoding 906. The display and/or I/O interface 908 may also be configured to receive input such as user input (e.g. with a keypad, touchscreen, touch area, microphone, biometric recognition etc.). The apparatus 900 also includes one or more communication interfaces (I/F(s)) 910, such as a network (NW) interface. The communication I/F(s) 910 may be wired and/or wireless and communicate over a channel or the Internet/other network(s) via any communication technique. The communication I/F(s) 910 may comprise one or more transmitters and one or more receivers. The communication I/F(s) 910 may comprise standard well-known components such as an amplifier, filter, frequency-converter, (de)modulator, and encoder/decoder circuitry(ies) and one or more antennas. In some examples, the processor 902 is configured to implement item 906 and/or item 907 without use of memory 904.

The apparatus 900 may be a remote, virtual or cloud apparatus. The apparatus 900 may be either a writer or a reader (e.g. parser), or both a writer and a reader (e.g.

parser). The apparatus 900 may be either a coder or a decoder, or both a coder and a decoder (codec). The apparatus 900 may be a user equipment (UE), a head mounted display (HMD), or any other fixed or mobile device.

The memory 904 may be implemented using any suitable data storage technology, such as semiconductor based memory devices, flash memory, magnetic memory devices and systems, optical memory devices and systems, fixed memory and removable memory. The memory 904 may comprise a database for storing data. Interface 912 enables data communication between the various items of apparatus 900, as shown in FIG. 17. Interface 912 may be one or more buses, or interface 912 may be one or more software interfaces configured to pass data within computer program code 905. For example, the interface 912 may be one or more buses such as address, data, or control buses, and may include any interconnection mechanism, such as a series of lines on a motherboard or integrated circuit, fiber optics or other optical communication equipment, and the like. In another example, interface 912 is an object-oriented software interface. The apparatus 900 need not comprise each of the features mentioned, or may comprise other features as well. The apparatus 900 may be an embodiment of and have the features of any of the apparatuses shown in FIG. 1A, FIG. 1B, FIG. 5, and/or FIG. 6.

Figure 18:
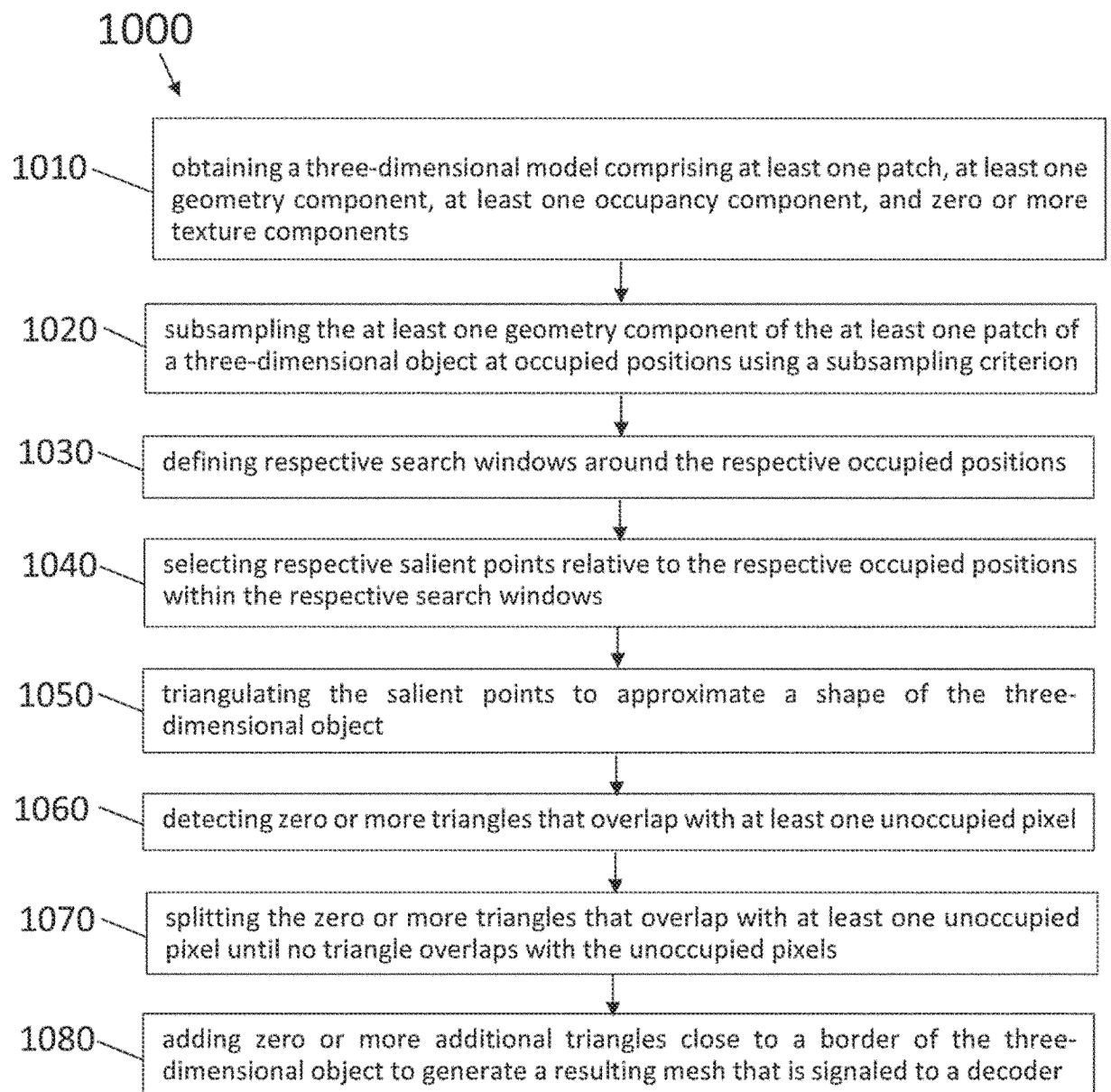
FIG. 18 is an example method to implement V3C patch remeshing for dynamic mesh coding, based on the examples described herein.

FIG. 18 is an example method 1000 to implement V3C patch remeshing for dynamic mesh coding, based on the examples described herein. At 1010, the method includes obtaining a three-dimensional model comprising at least one patch, at least one geometry component, at least one occupancy component, and zero or more texture components. At 1020, the method includes subsampling the at least one geometry component of the at least one patch of a three-dimensional object at occupied positions using a subsampling criterion. At 1030, the method includes defining respective search windows around the respective occupied positions. At 1040, the method includes selecting respective salient points relative to the respective occupied positions within the respective search windows. At 1050, the method includes triangulating the salient points to approximate a shape of the three-dimensional object. At 1060, the method includes detecting zero or more triangles that overlap with at least one unoccupied pixel. At 1070, the method includes splitting the zero or more triangles that overlap with at least one unoccupied pixel until no triangle overlaps with the unoccupied pixels. At 1080, the method includes adding zero or more additional triangles close to a border of the three-dimensional object to generate a resulting mesh that is signaled to a decoder. Method 1000 may be performed with apparatus 500, apparatus 600, apparatus 900, or an encoder apparatus.

Figure 19:
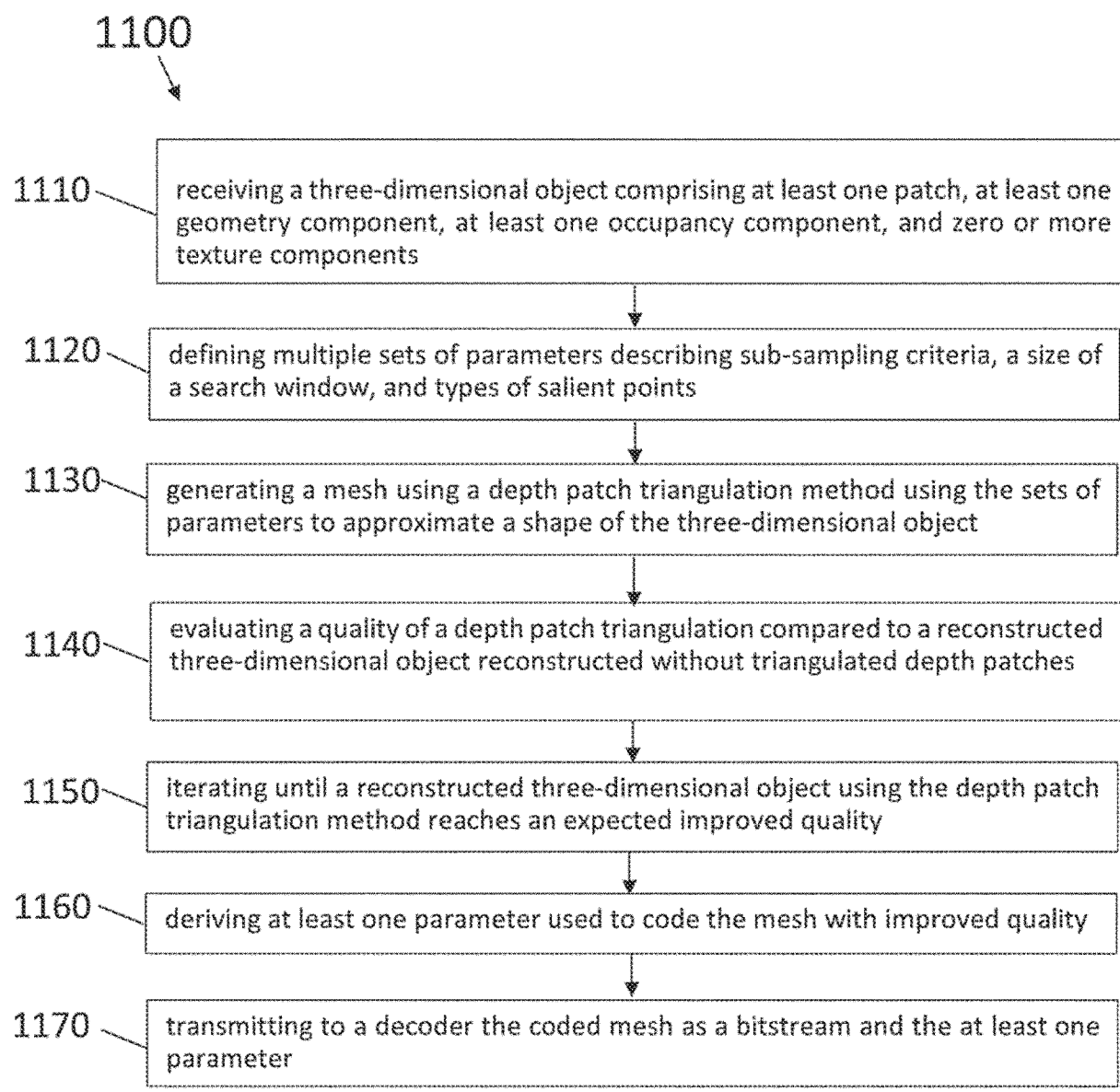
FIG. 19 is example encoder-side method to implement V3C patch remeshing for dynamic mesh coding, based on the examples described herein.

FIG. 19 is example encoder-side method 1100 to implement V3C patch remeshing for dynamic mesh coding, based on the examples described herein. At 1110, the method includes receiving a three-dimensional object comprising at least one patch, at least one geometry component, at least one occupancy component, and zero or more texture components. At 1120, the method includes defining multiple sets of parameters describing sub-sampling criteria, a size of a search window, and types of salient points. At 1130, the method includes generating a mesh using a depth patch triangulation method using the sets of parameters to approximate a shape of the three-dimensional object. At 1140, the method includes evaluating a quality of a depth patch triangulation compared to a reconstructed three-dimensional object reconstructed without triangulated depth patches. At 1150, the method includes iterating until a reconstructed three-dimensional object using the depth patch triangulation method reaches an expected improved quality. At 1160, the method includes deriving at least one parameter used to code the mesh with improved quality. At 1170, the method includes transmitting to a decoder the coded mesh as a bitstream and the at least one parameter. Method 1100 may be performed with apparatus 500 or apparatus 900.

Figure 20:
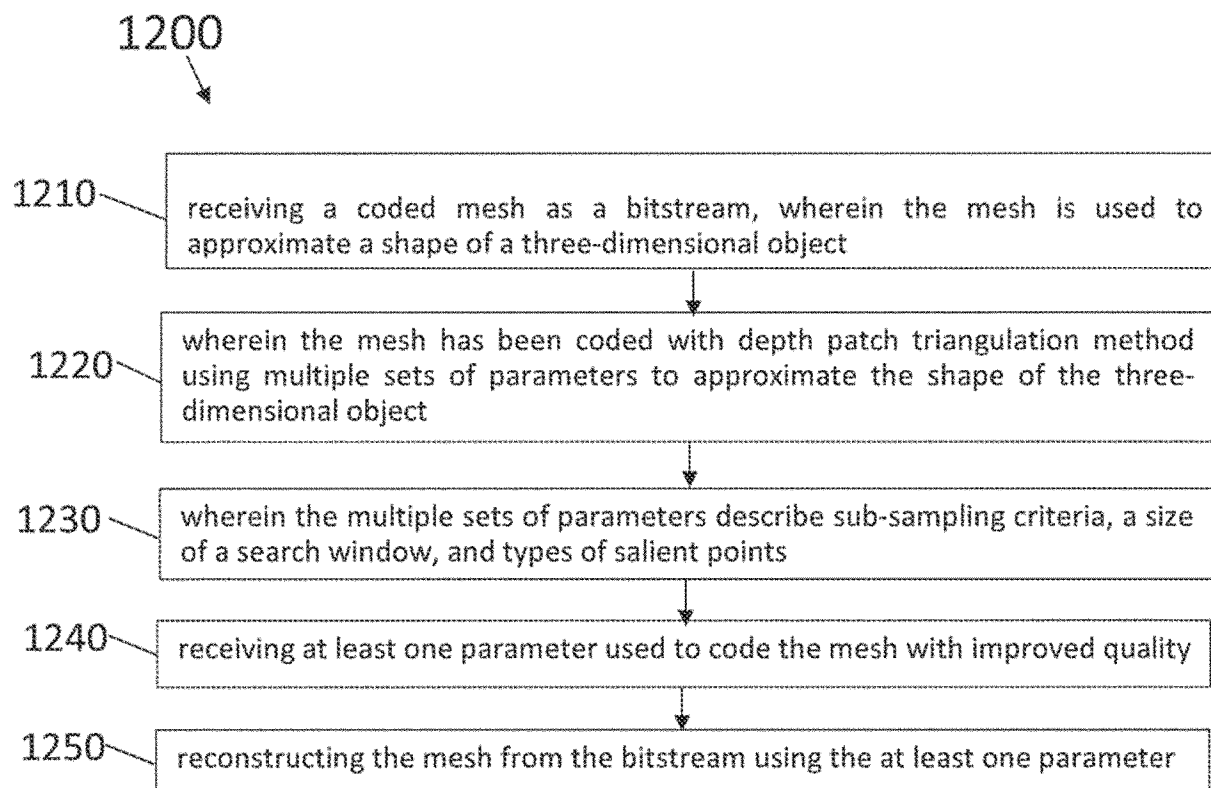
FIG. 20 is example decoder-side method to implement V3C patch remeshing for dynamic mesh coding, based on the examples described herein.

FIG. 20 is example decoder-side method 1200 to implement V3C patch remeshing for dynamic mesh coding, based on the examples described herein. At 1210, the method includes receiving a coded mesh as a bitstream, wherein the mesh is used to approximate a shape of a three-dimensional object. At 1220, the method includes wherein the mesh has been coded with depth patch triangulation method using multiple sets of parameters to approximate the shape of the three-dimensional object. At 1230, the method includes wherein the multiple sets of parameters describe sub-sampling criteria, a size of a search window, and types of salient points. At 1240, the method includes receiving at least one parameter used to code the mesh with improved quality. At 1250, the method includes reconstructing the mesh from the bitstream using the at least one parameter. Method 1100 may be performed with apparatus 600 or apparatus 900.

Figure 21:
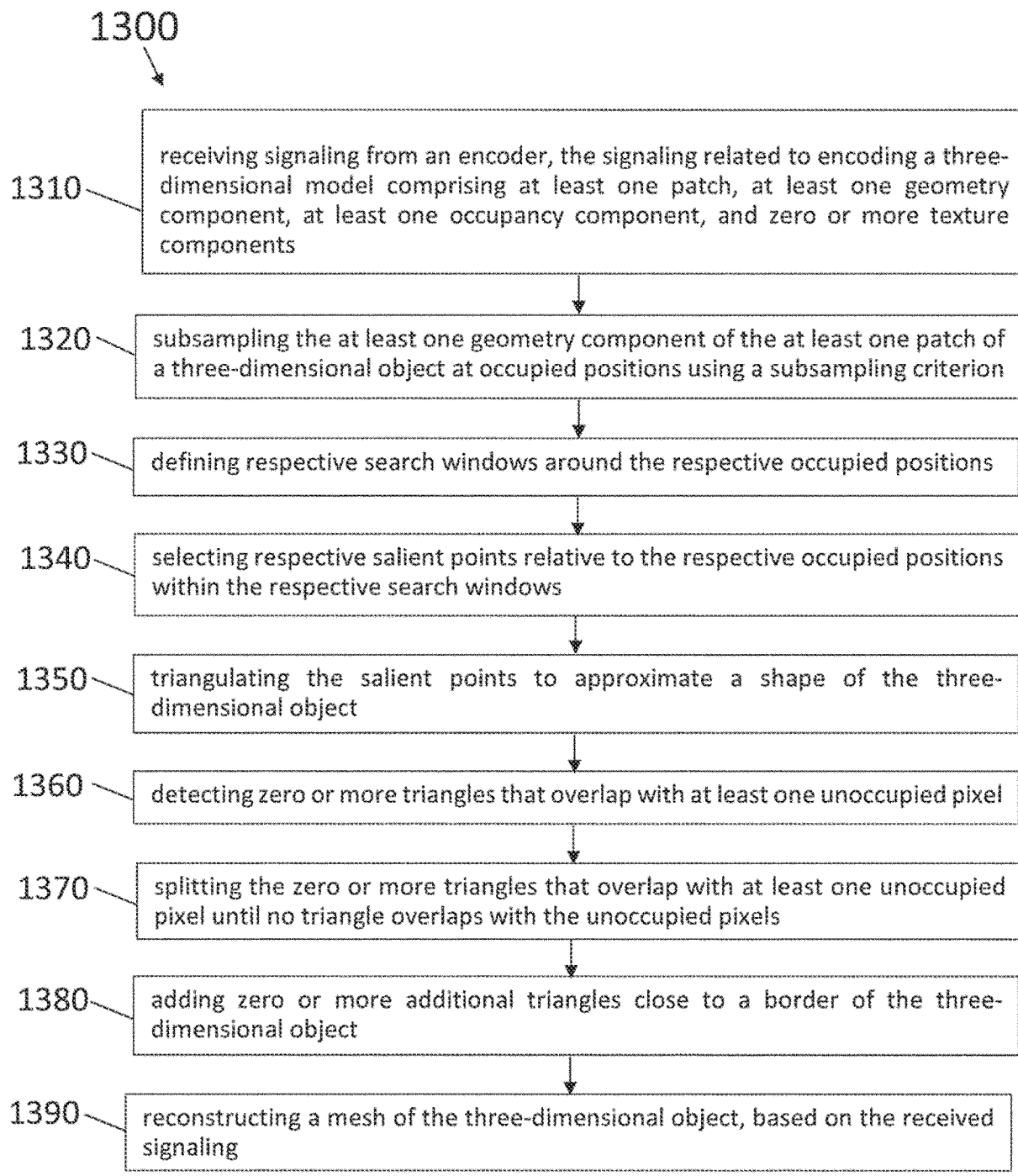
FIG. 21 is an example method to implement V3C patch remeshing for dynamic mesh coding, based on the examples described herein.

FIG. 21 is an example method 1300 to implement V3C patch remeshing for dynamic mesh coding, based on the examples described herein. At 1310, the method includes receiving signaling from an encoder, the signaling related to encoding a three-dimensional model comprising at least one patch, at least one geometry component, at least one occupancy component, and zero or more texture components. At 1320, the method includes subsampling the at least one geometry component of the at least one patch of a three-dimensional object at occupied positions using a subsampling criterion. At 1330, the method includes defining respective search windows around the respective occupied positions. At 1340, the method includes selecting respective salient points relative to the respective occupied positions within the respective search windows. At 1350, the method includes triangulating the salient points to approximate a shape of the three-dimensional object. At 1360, the method includes detecting zero or more triangles that overlap with at least one unoccupied pixel. At 1370, the method includes splitting the zero or more triangles that overlap with at least one unoccupied pixel until no triangle overlaps with the unoccupied pixels. At 1380, the method includes adding zero or more additional triangles close to a border of the three-dimensional object. At 1390, the method includes reconstructing a mesh of the three-dimensional object, based on the received signaling. Method 1300 may be performed with apparatus 500, apparatus 600, apparatus 900, or a decoder apparatus.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b)

combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry may also be used to mean a function or a process, such as one implemented by an encoder or decoder, or a codec.

In the figures, arrows between individual blocks represent operational couplings there-between as well as the direction of data flows on those couplings.

The following examples 1-49 are described herein.

Example 1: An apparatus includes at least one processor; and at least one memory including computer program code; wherein the at least one memory and the computer program code are configured to, with the at least one processor, cause the apparatus at least to: obtain a three-dimensional model comprising at least one patch, at least one geometry component, at least one occupancy component, and zero or more texture components; subsample the at least one geometry component of the at least one patch of a three-dimensional object at occupied positions using a subsampling criterion; define respective search windows around the respective occupied positions; select respective salient points relative to the respective occupied positions within the respective search windows; triangulate the salient points to approximate a shape of the three-dimensional object; detect zero or more triangles that overlap with at least one unoccupied pixel; split the zero or more triangles that overlap with at least one unoccupied pixel until no triangle overlaps with the unoccupied pixels; and add zero or more additional triangles close to a border of the three-dimensional object to generate a resulting mesh that is signaled to a decoder.

Example 2: The apparatus of example 1, wherein the at least one memory and the computer program code are further configured to, with the at least one processor, cause the apparatus at least to: signal a subsampling factor for the at least one patch within a bitstream using a patch data unit to signal a first sampling rate of a first coordinate axis of the at least one geometry component and a second sampling rate of a second coordinate axis of the at least one geometry component.

Example 3: The apparatus of any of examples 1 to 2, wherein the search windows are non-overlapping, such that at least one pixel or at least one column of pixels separates one search window from another search window.

Example 4: The apparatus of any of examples 1 to 3, wherein the salient points are chosen based on at least one of: a local extremum; a singular point on a curvature of the three-dimensional object; an umbilical point; or a point on a seam of texture coordinates or edges of texture pixels of a texture component.

Example 5: The apparatus of any of examples 1 to 4, wherein the zero or more triangles are split with sampling an occupied pixel substantially close to an edge of the zero or more triangles that overlap with at least one unoccupied pixel.

Example 6: The apparatus of any of examples 1 to 5, wherein the at least one memory and the computer program code are further configured to, with the at least one processor, cause the apparatus at least to: add at least one additional triangle within a core of the at least one patch.

Example 7: The apparatus of any of examples 1 to 6, wherein the at least one memory and the computer program code are further configured to, with the at least one processor, cause the apparatus at least to: smooth the resulting mesh.

Example 8: The apparatus of any of examples 1 to 7, wherein the at least one memory and the computer program code are further configured to, with the at least one processor, cause the apparatus at least to: signal a local search window size to the decoder, wherein the local search window size is a size of the search windows surrounding a subsampled occupied pixel of the at least one geometry component; signal information related to the salient points to the decoder, wherein the salient points are chosen so that a preliminary mesh approximates the shape of the three-dimensional object; and signal information related to iterative triangle refinement of the preliminary mesh, the iterative triangle refinement performed with adding one of the occupied positions to cover a percentage of contour pixels of the at least one geometry component.

Example 9: An apparatus includes at least one processor; and at least one memory including computer program code; wherein the at least one memory and the computer program code are configured to, with the at least one processor, cause the apparatus at least to: receive a three-dimensional object comprising at least one patch, at least one geometry component, at least one occupancy component, and zero or more texture components; define multiple sets of parameters describing sub-sampling criteria, a size of a search window, and types of salient points; generate a mesh using a depth patch triangulation method using the sets of parameters to approximate a shape of the three-dimensional object; evaluate a quality of a depth patch triangulation compared to a reconstructed three-dimensional object reconstructed without triangulated depth patches; iterate until a reconstructed three-dimensional object using the depth patch triangulation method reaches an expected improved quality; derive at least one parameter used to code the mesh with improved quality; and transmit to a decoder the coded mesh as a bitstream and the at least one parameter.

Example 10: The apparatus of example 9, wherein the at least one parameter is transmitted within a patch data unit syntax structure.

Example 11: The apparatus of any of examples 9 to 10, wherein the at least one memory and the computer program code are further configured to, with the at least one processor, cause the apparatus at least to: signal a level of detail patch data unit syntax element to the decoder; wherein the level of detail patch data unit syntax element is configured to be used with the decoder to reconstruct a triangulation of the at least one patch.

Example 12: The apparatus of example 11, wherein, in response to the level of detail patch data unit syntax element evaluating as true, a first coordinate scale and a second coordinate scale indication are used to define a sampling of the mesh.

Example 13: The apparatus of any of examples 9 to 12, wherein the at least one memory and the computer program code are further configured to, with the at least one processor, cause the apparatus at least to: signal a subsampling of the mesh within an atlas sequence parameter set or a supplemental enhancement information message.

Example 14: The apparatus of any of examples 9 to 13, wherein the at least one memory and the computer program code are further configured to, with the at least one processor, cause the apparatus at least to: signal a local search window size to the decoder, wherein the local search window size is a size of a search window surrounding a subsampled occupied pixel of the at least one geometry component; signal information related to at least one salient point to the decoder, wherein the at least one salient point is chosen so that the mesh approximates the shape of the three-dimensional object; and signal information to the decoder related to iterative triangle refinement of the mesh, the iterative triangle refinement performed with adding at least one occupied position to cover a percentage of contour pixels of the at least one geometry component.

Example 15: An apparatus includes at least one processor; and at least one memory including computer program code; wherein the at least one memory and the computer program code are configured to, with the at least one processor, cause the apparatus at least to: receive a coded mesh as a bitstream, wherein the mesh is used to approximate a shape of a three-dimensional object; wherein the mesh has been coded with depth patch triangulation method using multiple sets of parameters to approximate the shape of the three-dimensional object; wherein the multiple sets of parameters describe sub-sampling criteria, a size of a search window, and types of salient points; receive at least one parameter used to code the mesh with improved quality; and reconstruct the mesh from the bitstream using the at least one parameter.

Example 16: The apparatus of example 15, wherein the at least one parameter is received within a patch data unit syntax structure.

Example 17: The apparatus of any of examples 15 to 16, wherein the at least one memory and the computer program code are further configured to, with the at least one processor, cause the apparatus at least to: receive signaling comprising a level of detail patch data unit syntax element; and reconstruct a triangulation of the at least one patch based on the level of detail patch data unit syntax element.

Example 18: The apparatus of example 17, wherein the at least one memory and the computer program code are further configured to, with the at least one processor, cause the apparatus at least to: in response to the level of detail patch data unit syntax element evaluating as true, use a first coordinate scale and a second coordinate scale indication to define a sampling of the mesh.

Example 19: The apparatus of any of examples 15 to 18, wherein the at least one memory and the computer program code are further configured to, with the at least one processor, cause the apparatus at least to: receive signaling of a subsampling of the mesh within an atlas sequence parameter set or a supplemental enhancement information message.

Example 20: The apparatus of any of examples 15 to 19, wherein the at least one memory and the computer program code are further configured to, with the at least one processor, cause the apparatus at least to: receive signaling of a local search window size from an encoder, wherein the local search window size is a size of a search window surrounding a subsampled occupied pixel of at least one geometry component; receive signaling of information related to at least one salient point from the encoder, wherein the at least one salient point is chosen so that the mesh approximates the shape of the three-dimensional object; and receive signaling of information from the encoder related to iterative triangle refinement of the mesh, the iterative triangle refinement performed with adding at least one occupied position to cover a percentage of contour pixels of the at least one geometry component.

Example 21: A method includes obtaining a three-dimensional model comprising at least one patch, at least one geometry component, at least one occupancy component, and zero or more texture components; subsampling the at least one geometry component of the at least one patch of a three-dimensional object at occupied positions using a subsampling criterion; defining respective search windows around the respective occupied positions; selecting respective salient points relative to the respective occupied positions within the respective search windows; triangulating the salient points to approximate a shape of the three-dimensional object; detecting zero or more triangles that overlap with at least one unoccupied pixel; splitting the zero or more triangles that overlap with at least one unoccupied pixel until no triangle overlaps with the unoccupied pixels; and adding zero or more additional triangles close to a border of the three-dimensional object to generate a resulting mesh that is signaled to a decoder.

Example 22: A method includes receiving a three-dimensional object comprising at least one patch, at least one geometry component, at least one occupancy component, and zero or more texture components; defining multiple sets of parameters describing sub-sampling criteria, a size of a search window, and types of salient points; generating a mesh using a depth patch triangulation method using the sets of parameters to approximate a shape of the three-dimensional object; evaluating a quality of a depth patch triangulation compared to a reconstructed three-dimensional object reconstructed without triangulated depth patches; iterating until a reconstructed three-dimensional object using the depth patch triangulation method reaches an expected improved quality; deriving at least one parameter used to code the mesh with improved quality; and transmitting to a decoder the coded mesh as a bitstream and the at least one parameter.

Example 23: A method includes receiving a coded mesh as a bitstream, wherein the mesh is used to approximate a shape of a three-dimensional object; wherein the mesh has been coded with depth patch triangulation method using multiple sets of parameters to approximate the shape of the three-dimensional object; wherein the multiple sets of parameters describe sub-sampling criteria, a size of a search window, and types of salient points; receiving at least one parameter used to code the mesh with improved quality; and reconstructing the mesh from the bitstream using the at least one parameter.

Example 24: An apparatus includes means for subsampling the at least one geometry component of the at least one patch of a three-dimensional object at occupied positions using a subsampling criterion; means for defining respective search windows around the respective occupied positions; means for selecting respective salient points relative to the respective occupied positions within the respective search windows; means for triangulating the salient points to approximate a shape of the three-dimensional object; means for detecting zero or more triangles that overlap with at least one unoccupied pixel; means for splitting the zero or more triangles that overlap with at least one unoccupied pixel until no triangle overlaps with the unoccupied pixels; and means for adding zero or more additional triangles close to a border of the three-dimensional object to generate a resulting mesh that is signaled to a decoder.

Example 25: An apparatus includes means for receiving a three-dimensional object comprising at least one patch, at least one geometry component, at least one occupancy component, and zero or more texture components; means for defining multiple sets of parameters describing sub-sampling criteria, a size of a search window, and types of salient points; means for generating a mesh using a depth patch triangulation method using the sets of parameters to approximate a shape of the three-dimensional object; means for evaluating a quality of a depth patch triangulation compared to a reconstructed three-dimensional object reconstructed without triangulated depth patches; means for iterating until a reconstructed three-dimensional object using the depth patch triangulation method reaches an expected improved quality; means for deriving at least one parameter used to code the mesh with improved quality; and means for transmitting to a decoder the coded mesh as a bitstream and the at least one parameter.

Example 26: An apparatus includes means for receiving a coded mesh as a bitstream, wherein the mesh is used to approximate a shape of a three-dimensional object; wherein the mesh has been coded with depth patch triangulation method using multiple sets of parameters to approximate the shape of the three-dimensional object; wherein the multiple sets of parameters describe sub-sampling criteria, a size of a search window, and types of salient points; means for receiving at least one parameter used to code the mesh with improved quality; and means for reconstructing the mesh from the bitstream using the at least one parameter.

Example 27: A non-transitory program storage device readable by a machine, tangibly embodying a program of instructions executable with the machine for performing operations, the operations comprising: obtaining a three-dimensional model comprising at least one patch, at least one geometry component, at least one occupancy component, and zero or more texture components; subsampling the at least one geometry component of the at least one patch of a three-dimensional object at occupied positions using a subsampling criterion; defining respective search windows around the respective occupied positions; selecting respective salient points relative to the respective occupied positions within the respective search windows; triangulating the salient points to approximate a shape of the three-dimensional object; detecting zero or more triangles that overlap with at least one unoccupied pixel; splitting the zero or more triangles that overlap with at least one unoccupied pixel until no triangle overlaps with the unoccupied pixels; and adding zero or more additional triangles close to a border of the three-dimensional object to generate a resulting mesh that is signaled to a decoder.

Example 28: A non-transitory program storage device readable by a machine, tangibly embodying a program of instructions executable with the machine for performing operations, the operations comprising: receiving a three-dimensional object comprising at least one patch, at least one geometry component, at least one occupancy component, and zero or more texture components; defining multiple sets of parameters describing sub-sampling criteria, a size of a search window, and types of salient points; generating a mesh using a depth patch triangulation method using the sets of parameters to approximate a shape of the three-dimensional object; evaluating a quality of a depth patch triangulation compared to a reconstructed three-dimensional object reconstructed without triangulated depth patches; iterating until a reconstructed three-dimensional object using the depth patch triangulation method reaches an expected improved quality; deriving at least one parameter used to code the mesh with improved quality; and transmitting to a decoder the coded mesh as a bitstream and the at least one parameter.

Example 29: A non-transitory program storage device readable by a machine, tangibly embodying a program of instructions executable with the machine for performing operations, the operations comprising: receiving a coded mesh as a bitstream, wherein the mesh is used to approximate a shape of a three-dimensional object; wherein the mesh has been coded with depth patch triangulation method using multiple sets of parameters to approximate the shape of the three-dimensional object; wherein the multiple sets of parameters describe sub-sampling criteria, a size of a search window, and types of salient points; receiving at least one parameter used to code the mesh with improved quality; and reconstructing the mesh from the bitstream using the at least one parameter.

Example 30: An apparatus includes at least one processor; and at least one memory including computer program code; wherein the at least one memory and the computer program code are configured to, with the at least one processor, cause the apparatus at least to: receive signaling from an encoder, the signaling related to encoding a three-dimensional model comprising at least one patch, at least one geometry component, at least one occupancy component, and zero or more texture components; subsample the at least one geometry component of the at least one patch of a three-dimensional object at occupied positions using a subsampling criterion; define respective search windows around the respective occupied positions; select respective salient points relative to the respective occupied positions within the respective search windows; triangulate the salient points to approximate a shape of the three-dimensional object; detect zero or more triangles that overlap with at least one unoccupied pixel; split the zero or more triangles that overlap with at least one unoccupied pixel until no triangle overlaps with the unoccupied pixels; add zero or more additional triangles close to a border of the three-dimensional object; and reconstruct a mesh of the three-dimensional object, based on the received signaling.

Example 31: The apparatus of example 30, wherein the signaling comprises at least one of: mesh reconstruction information; a type at least one of the salient points; a local window size; or a percentage of contours.

Example 32: The apparatus of any of examples 30 to 31, wherein the subsampling of the at least one geometry component of the at least one patch of the three-dimensional object at occupied positions using the subsampling criterion is optionally performed using the received signaling.

Example 33: The apparatus of example 32, wherein the received signaling comprises the subsampling criterion.

Example 34: The apparatus of any of examples 30 to 33, wherein the defining of the respective search windows around the respective occupied positions is optionally performed using the received signaling.

Example 35: The apparatus of example 34, wherein the received signaling comprises a size of the respective search windows.

Example 36: The apparatus of any of examples 30 to 35, wherein the selecting of the respective salient points relative to the respective occupied positions within the respective search windows is optionally performed using the received signaling.

Example 37: The apparatus of example 36, wherein the received signaling comprises a type of the respective salient points.

Example 38: The apparatus of any of examples 30 to 37, wherein the adding of the zero or more additional triangles close to the border of the three-dimensional object is optionally performed using the received signaling.

Example 39: The apparatus of example 38, wherein the received signaling comprises a percentage of contours.

Example 40: A method includes receiving signaling from an encoder, the signaling related to encoding a three-dimensional model comprising at least one patch, at least one geometry component, at least one occupancy component, and zero or more texture components; subsampling the at least one geometry component of the at least one patch of a three-dimensional object at occupied positions using a subsampling criterion; defining respective search windows around the respective occupied positions; selecting respective salient points relative to the respective occupied positions within the respective search windows; triangulating the salient points to approximate a shape of the three-dimensional object; detecting zero or more triangles that overlap with at least one unoccupied pixel; splitting the zero or more triangles that overlap with at least one unoccupied pixel until no triangle overlaps with the unoccupied pixels; adding zero or more additional triangles close to a border of the three-dimensional object; and reconstructing a mesh of the three-dimensional object, based on the received signaling.

Example 41: The method of example 32, wherein the signaling comprises at least one of: mesh reconstruction information; a type at least one of the salient points; a local window size; or a percentage of contours.

Example 42: The method of any of examples 40 to 41, wherein the subsampling of the at least one geometry component of the at least one patch of the three-dimensional object at occupied positions using the subsampling criterion is optionally performed using the received signaling.

Example 43: The method of example 42, wherein the received signaling comprises the subsampling criterion.

Example 44: The method of any of examples 40 to 43, wherein the defining of the respective search windows around the respective occupied positions is optionally performed using the received signaling.

Example 45: The method of example 44, wherein the received signaling comprises a size of the respective search windows.

Example 46: The method of any of examples 40 to 45, wherein the selecting of the respective salient points relative to the respective occupied positions within the respective search windows is optionally performed using the received signaling.

Example 47: The method of example 46, wherein the received signaling comprises a type of the respective salient points.

Example 48: The method of any of examples 40 to 47, wherein the adding of the zero or more additional triangles close to the border of the three-dimensional object is optionally performed using the received signaling.

Example 49: The method of example 48, wherein the received signaling comprises a percentage of contours.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:
2D or 2d two-dimensional
3D or 3d three-dimensional
3DG 3D graphics coding group
6DOF six degrees of freedom
ACL atlas coding layer
AFPS atlas frame parameter set
AR augmented reality
ASIC application-specific integrated circuit
asps or ASPS atlas sequence parameter set
ath atlas tile header
CD committee draft
CfP call for proposals
CGI computer-generated imagery
DWT discrete wavelet transform
EOM enhanced occupancy mode
FIR finite impulse response
glTF graphics language transmission format
H.264 advanced video coding video compression standard
H.265 high efficiency video coding video compression standard
HMD head mounted display
id or ID identifier
idc indication
Idx index
IEC International Electrotechnical Commission
I/F interface
I/O input/output
ISO International Organization for Standardization
lod or LOD level of detail(s)
miv or MIV MPEG immersive video
MPEG moving picture experts group
MPEG-I MPEG immersive
MR mixed reality
mri mesh reconstruction information
NAL or nal network abstraction layer
NW network
pdu patch data unit
pos position, or files containing text descriptions of a position
QEM quadric error metric
rbsp or RBSP raw byte sequence payload
SC subcommittee
u(n) unsigned integer using n bits, e.g. u(1), u(2)
UE user equipment
ue(v) unsigned integer exponential Golomb coded syntax element with the left bit first
UV coordinate texture, where "U" and "V" are axes of a 2D texture
u(v) unsigned integer, where the number of bits is determined by the value of other syntax elements
V3C visual volumetric video-based coding
VPCC or V-PCC video-based point cloud coding/compression
VPS V3C parameter set
VR virtual reality
WG working group

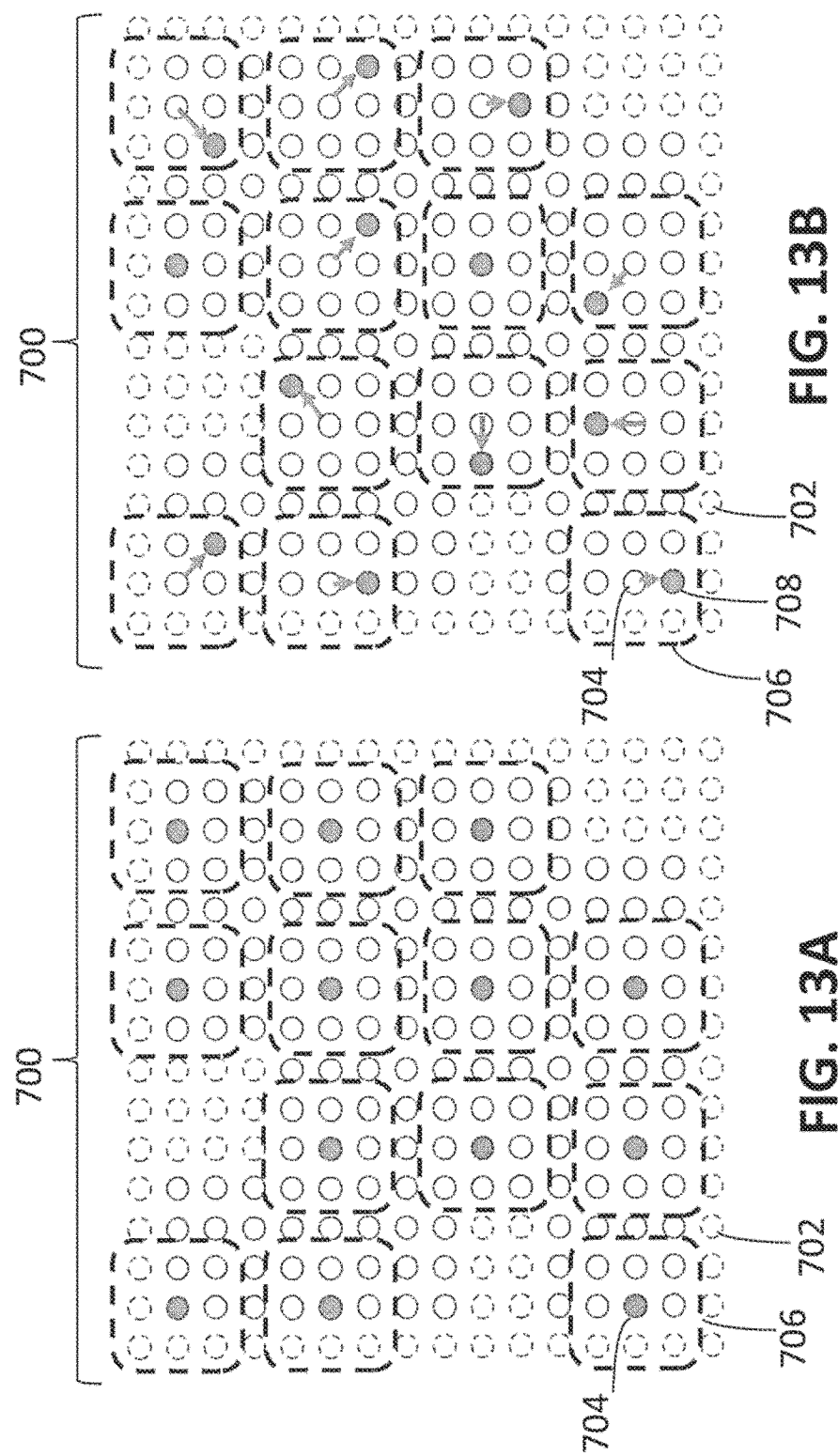

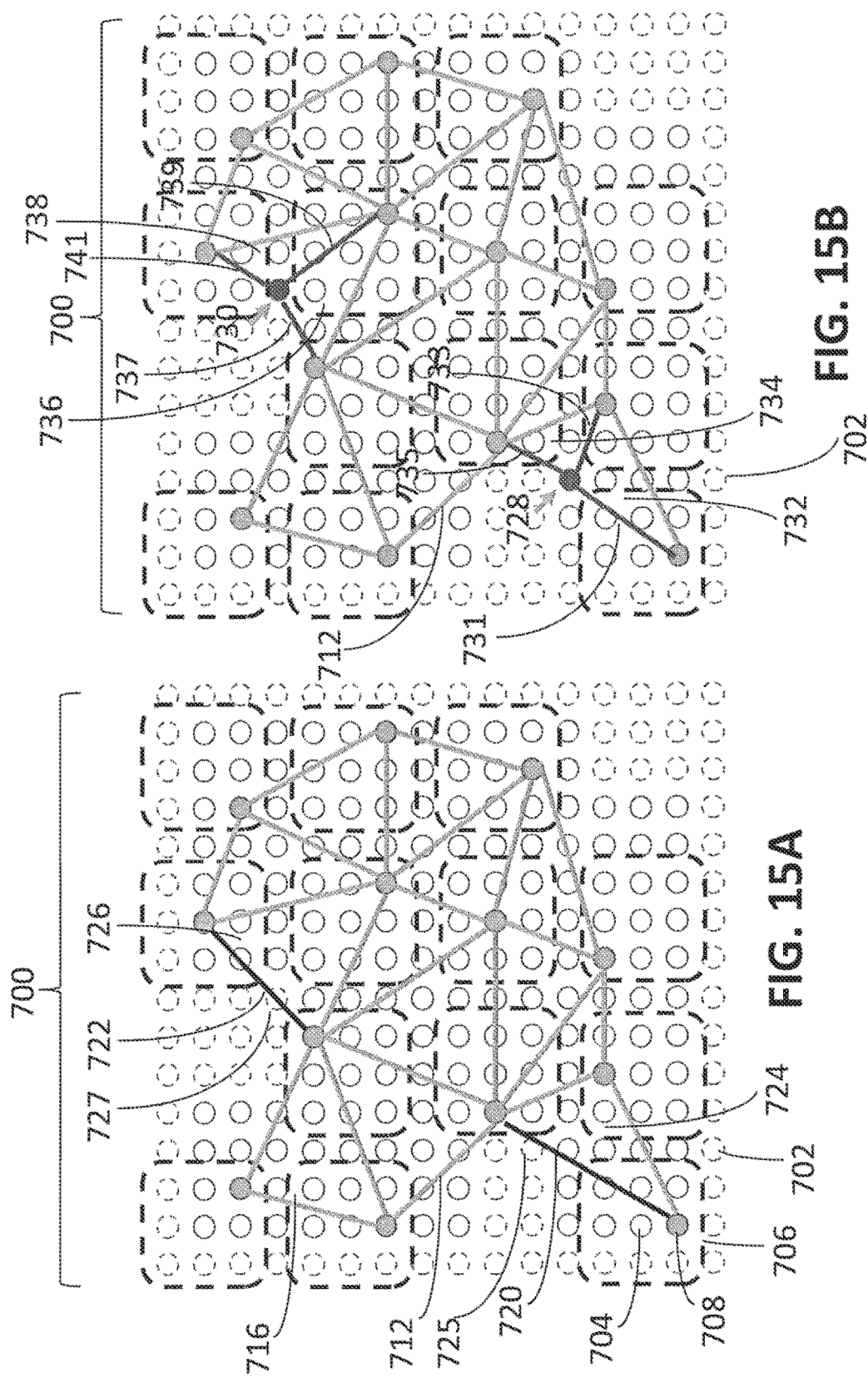

What is claimed is:
1. An apparatus comprising:
at least one processor; and
at least one non-transitory memory storing instructions that, when executed by the at least one processor, cause the apparatus at least to:

obtain a three-dimensional model comprising at least one patch, at least one geometry component, at least one occupancy component, and zero or more texture components;

subsample the at least one geometry component of the at least one patch of a three-dimensional object at occupied positions using a subsampling criterion;

define respective search windows around the respective occupied positions;

select respective salient points relative to the respective occupied positions within the respective search windows;

triangulate the salient points to approximate a shape of the three-dimensional object;

detect zero or more triangles that overlap with at least one unoccupied pixel;

split the zero or more triangles that overlap with at least one unoccupied pixel until no triangle overlaps with the unoccupied pixels; and add zero or more additional triangles close to a border of the three-dimensional object to generate a resulting mesh that is signaled to a decoder.

2. The apparatus of claim 1, wherein the instructions, when executed by the at least one processor, cause the apparatus at least to:

signal a subsampling factor for the at least one patch within a bitstream using a patch data unit to signal a first sampling rate of a first coordinate axis of the at least one geometry component and a second sampling rate of a second coordinate axis of the at least one geometry component.

3. The apparatus of claim 1, wherein the search windows are non-overlapping, such that at least one pixel or at least one column of pixels separates one search window from another search window.

4. The apparatus of claim 1, wherein the salient points are chosen based on at least one of:

a local extremum;

a singular point on a curvature of the three-dimensional object;

an umbilical point; or a point on a seam of texture coordinates or edges of texture pixels of a texture component.

5. The apparatus of claim 1, wherein the zero or more triangles are split with sampling an occupied pixel substantially close to an edge of the zero or more triangles that overlap with at least one unoccupied pixel.

6. The apparatus of claim 1, wherein the instructions, when executed by the at least one processor, cause the apparatus at least to:

add at least one additional triangle within a core of the at least one patch.

7. The apparatus of claim 1, wherein the instructions, when executed by the at least one processor, cause the apparatus at least to:

smooth the resulting mesh.

8. The apparatus of claim 1, wherein the instructions, when executed by the at least one processor, cause the apparatus at least to:

signal a local search window size to the decoder, wherein the local search window size is a size of the search windows surrounding a subsampled occupied pixel of the at least one geometry component;

signal information related to the salient points to the decoder, wherein the salient points are chosen so that a preliminary mesh approximates the shape of the three-dimensional object; and signal information related to iterative triangle refinement of the preliminary mesh, the iterative triangle refinement performed with adding one of the occupied positions to cover a percentage of contour pixels of the at least one geometry component.

9. An apparatus comprising:

at least one processor; and at least one non-transitory memory storing instructions that, when executed by the at least one processor, cause the apparatus at least to:

receive a three-dimensional object comprising at least one patch, at least one geometry component, at least one occupancy component, and zero or more texture components;

define multiple sets of parameters describing sub-sampling criteria, a size of a search window, and types of salient points;

generate a mesh using a depth patch triangulation method using the sets of parameters to approximate a shape of the three-dimensional object;

evaluate a quality of a depth patch triangulation compared to a reconstructed three-dimensional object reconstructed without triangulated depth patches;

iterate until a reconstructed three-dimensional object using the depth patch triangulation method reaches an expected improved quality;

derive at least one parameter used to code the mesh with improved quality; and transmit to a decoder the coded mesh as a bitstream and the at least one parameter.

10. The apparatus of claim 9, wherein the at least one parameter is transmitted within a patch data unit syntax structure.

11. The apparatus of any claim 9, wherein the instructions, when executed by the at least one processor, cause the apparatus at least to:

signal a level of detail patch data unit syntax element to the decoder;

wherein the level of detail patch data unit syntax element is configured to be used with the decoder to reconstruct a triangulation of the at least one patch.

12. The apparatus of claim 11, wherein, in response to the level of detail patch data unit syntax element evaluating as true, a first coordinate scale and a second coordinate scale indication are used to define a sampling of the mesh.

13. The apparatus of claim 9, wherein the instructions, when executed by the at least one processor, cause the apparatus at least to:

signal a subsampling of the mesh within an atlas sequence parameter set or a supplemental enhancement information message.

14. The apparatus of claim 9, wherein the instructions, when executed by the at least one processor, cause the apparatus at least to:

signal a local search window size to the decoder, wherein the local search window size is a size of a search window surrounding a subsampled occupied pixel of the at least one geometry component;

signal information related to at least one salient point to the decoder, wherein the at least one salient point is chosen so that the mesh approximates the shape of the three-dimensional object; and signal information to the decoder related to iterative triangle refinement of the mesh, the iterative triangle refinement performed with adding at least one occupied position to cover a percentage of contour pixels of the at least one geometry component.

15. An apparatus comprising:
at least one processor; and
at least one non-transitory memory storing instructions that, when executed by the at least one processor, cause the apparatus at least to:
receive a coded mesh as a bitstream, wherein the mesh is used to approximate a shape of a three-dimensional object;
wherein the mesh has been coded with depth patch triangulation method using multiple sets of parameters to approximate the shape of the three-dimensional object;
wherein the multiple sets of parameters describe subsampling criteria, a size of a search window, and types of salient points;
receive at least one parameter used to code the mesh with improved quality; and
reconstruct the mesh from the bitstream using the at least one parameter.

16. The apparatus of claim 15, wherein the at least one parameter is received within a patch data unit syntax structure.

17. The apparatus of claim 15, wherein the instructions, when executed by the at least one processor, cause the apparatus at least to:
receive signaling comprising a level of detail patch data unit syntax element; and
reconstruct a triangulation of the at least one patch based on the level of detail patch data unit syntax element.

18. The apparatus of claim 17, wherein the instructions, when executed by the at least one processor, cause the apparatus at least to:
in response to the level of detail patch data unit syntax element evaluating as true, use a first coordinate scale and a second coordinate scale indication to define a sampling of the mesh.

19. The apparatus of claim 15, wherein the instructions, when executed by the at least one processor, cause the apparatus at least to:
receive signaling of a subsampling of the mesh within an atlas sequence parameter set or a supplemental enhancement information message.

20. The apparatus of claim 15, wherein the instructions, when executed by the at least one processor, cause the apparatus at least to:
receive signaling of a local search window size from an encoder, wherein the local search window size is a size of a search window surrounding a subsampled occupied pixel of at least one geometry component;
receive signaling of information related to at least one salient point from the encoder, wherein the at least one salient point is chosen so that the mesh approximates the shape of the three-dimensional object; and
receive signaling of information from the encoder related to iterative triangle refinement of the mesh, the iterative triangle refinement performed with adding at least one occupied position to cover a percentage of contour pixels of the at least one geometry component.

21. An apparatus comprising:
at least one processor; and
at least one non-transitory memory storing instructions that, when executed by the at least one processor, cause the apparatus at least to:
receive signaling from an encoder, the signaling related to encoding a three-dimensional model comprising at least one patch, at least one geometry component, at least one occupancy component, and zero or more texture components;
subsample the at least one geometry component of the at least one patch of a three-dimensional object at occupied positions using a subsampling criterion;
define respective search windows around the respective occupied positions;
select respective salient points relative to the respective occupied positions within the respective search windows;
triangulate the salient points to approximate a shape of the three-dimensional object;
detect zero or more triangles that overlap with at least one unoccupied pixel;
split the zero or more triangles that overlap with at least one unoccupied pixel until no triangle overlaps with the unoccupied pixels;
add zero or more additional triangles close to a border of the three-dimensional object; and
reconstruct a mesh of the three-dimensional object, based on the received signaling.

22. The apparatus of claim 21, wherein the signaling comprises at least one of:
mesh reconstruction information;
a type at least one of the salient points;
a local window size; or
a percentage of contours.

23. The apparatus of claim 21, wherein the subsampling of the at least one geometry component of the at least one patch of the three-dimensional object at occupied positions using the subsampling criterion is performed using the received signaling.

24. The apparatus of claim 23, wherein the received signaling comprises the subsampling criterion.

25. The apparatus of claim 21, wherein the defining of the respective search windows around the respective occupied positions is performed using the received signaling.

26. The apparatus of claim 25, wherein the received signaling comprises a size of the respective search windows.

27. The apparatus of claim 21, wherein the selecting of the respective salient points relative to the respective occupied positions within the respective search windows is performed using the received signaling.

28. The apparatus of claim 27, wherein the received signaling comprises a type of the respective salient points.

29. The apparatus of claim 21, wherein the adding of the zero or more additional triangles close to the border of the three-dimensional object is performed using the received signaling.

30. The apparatus of claim 29, wherein the received signaling comprises a percentage of contours.

* * * * *

UNITED STATES PATENT AND TRADEMARK OFFICE
CERTIFICATE OF CORRECTION

| | | |
|---|---|---|
| PATENT NO. | : 12,120,306 B2 | Page 1 of 20 |
| APPLICATION NO. | : 18/116937 | |
| DATED | : October 15, 2024 | |
| INVENTOR(S) | : Patrice Rondao Alface et al. | |

It is certified that error appears in the above-identified patent and that said Letters Patent is hereby corrected as shown below:

On the Title Page

Replace the Title Page with the attached Title Page

In the Drawings

Please add Fig 4-21

Signed and Sealed this
Thirteenth Day of May, 2025

Coke Morgan Stewart
*Acting Director of the United States Patent and Trademark Office*

(12) United States Patent
Rondao Alface et al.

(10) Patent No.: US 12,120,306 B2
(45) Date of Patent: Oct. 15, 2024

(54) V3C PATCH REMESHING FOR DYNAMIC MESH CODING

(71) Applicant: Nokia Technologies Oy, Espoo (FI)

(72) Inventors: Patrice Rondao Alface, Evere (BE); Aleksei Martemianov, Tampere (FI); Lukasz Kondrad, Munich (DE); Lauri Aleksi Ilola, Munich (DE); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 18/116,937

(22) Filed: Mar. 3, 2023

(65) Prior Publication Data
US 2023/0300336 A1    Sep. 21, 2023

Related U.S. Application Data

(60) Provisional application No. 63/321,176, filed on Mar. 18, 2022.

(51) Int. Cl.
*H04N 19/132*      (2014.01)
*H04N 19/182*      (2014.01)
*H04N 19/20*       (2014.01)

(52) U.S. Cl.
CPC ......... *H04N 19/132* (2014.11); *H04N 19/182* (2014.11); *H04N 19/20* (2014.11)

(58) Field of Classification Search
CPC .................................................. H04N 19/132
USPC ...................................................... 375/240.02
See application file for complete search history.

(56) References Cited

U.S. PATENT DOCUMENTS 9,478,002 B2 * 10/2016 Yang ................ H04N 19/50
11,823,421 B2 * 11/2023 Ilola ................ G06T 9/001
2021/0097724 A1 * 4/2021 Roimela .......... H04N 19/70
(Continued)

OTHER PUBLICATIONS

Michael Garland and Paul S. Heckbert. Simplifying surfaces with color and texture using quadric error metrics. In Proceedings of the conference on Visualization '98 (VIS '98). IEEE Computer Society Press, Washington, DC, USA, 263-269, 1998.
(Continued)

*Primary Examiner* — Yulin Sun
(74) *Attorney, Agent, or Firm* — Joseph C. Drish; Harrington & Smith

(57) ABSTRACT

An apparatus comprising circuitry configured to: obtain a three-dimensional model comprising at least one patch, at least one geometry component, at least one occupancy component, and zero or more texture components; subsample the at least one geometry component of the at least one patch of a three-dimensional object at occupied positions using a subsampling criterion; define respective search windows around the respective occupied positions; select respective salient points relative to the respective occupied positions within the respective search windows; triangulate the salient points to approximate a shape of the three-dimensional object; detect zero or more triangles that overlap with at least one unoccupied pixel; split the zero or more triangles that overlap with at least one unoccupied pixel until no triangle overlaps with the unoccupied pixels; and add zero or more additional triangles close to a border of the three-dimensional object to generate a resulting mesh signaled to a decoder.

30 Claims, 24 Drawing Sheets

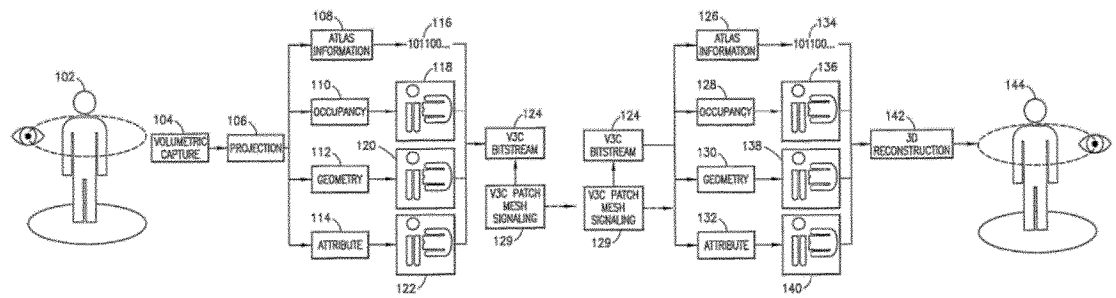

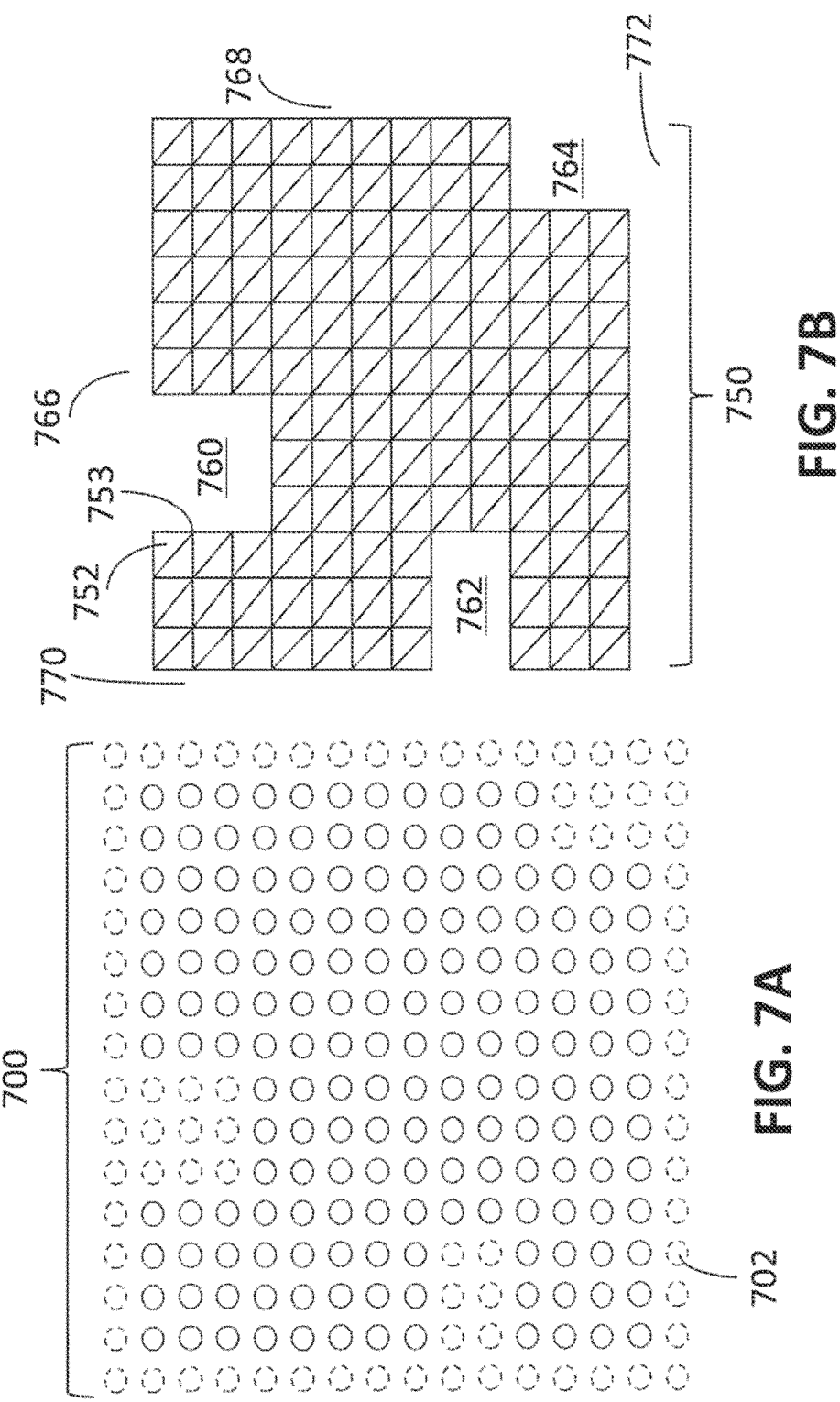

| atlas_sequence_parameter_set_rbsp( ) { | Descriptor |
|---|---|
| ... | |
| asps_extension_present_flag | u(1) |
| If (asps_extension_present_flag ){ | |
| ... | |
| asps_mesh_extension_present_flag | u(1) |
| ... | |
| } | |
| if( asps_vpcc_extension_present_flag ) | |
|     asps_vpcc_extension( ) /* Specified in Annex H */ | |
| if( asps_miv_extension_present_flag ) | |
|     asps_miv_extension( ) /* Specified in ISO/IEC 23090-12 */ | |
| if( asps_mesh_extension_present_flag ) | |
|     asps_mesh_extension( ) | |
| if( asps_extension_5bits ) | |
|     while( more_rbsp_data( ) ) | |
|         asps_extension_data_flag | u(1) |
| rbsp_trailing_bits( ) | |
| } | |
| } | |

920 — (bracket around asps_extension_present_flag block)
922 — (bracket around asps_mesh_extension block)

| asps_mesh_extension( ) { | Descriptor |
|---|---|
| ... | |
| asps_lod_subsampling_enable_flag | u(1) |
| ... | |
| } | |

FIG. 9

| patch_data_unit( tileID, patchIdx ) { | Descriptor |
|---|---|
|    pdu_2d_pos_x[ tileID ][ patchIdx ] | ue(v) |
|    pdu_2d_pos_y[ tileID ][ patchIdx ] | ue(v) |
|    pdu_2d_size_x_minus1[ tileID ][ patchIdx ] | ue(v) |
|    pdu_2d_size_y_minus1[ tileID ][ patchIdx ] | ue(v) |
|    pdu_3d_offset_u[ tileID ][ patchIdx ] | u(v) |
|    pdu_3d_offset_v[ tileID ][ patchIdx ] | u(v) |
|    pdu_3d_offset_d[ tileID ][ patchIdx ] | u(v) |
|    if( asps_normal_axis_max_delta_value_enabled_flag ) | |
|       pdu_3d_range_d[ tileID ][ patchIdx ] | u(v) |
|    pdu_projection_id[ tileID ][ patchIdx ] | u(v) |
|    pdu_orientation_index[ tileID ][ patchIdx ] | u(v) |
|    if( afps_lod_mode_enabled_flag ) { | |
|       pdu_lod_enabled_flag[ tileID ][ patchIdx ] | u(1) |
|       if( pdu_lod_enabled_flag[ tileID ][ patchIdx ] ) { | |
|          pdu_lod_scale_x_minus1[ tileID ][ patchIdx ] | ue(v) |
|          pdu_lod_scale_y_idc[ tileID ][ patchIdx ] | ue(v) |
|       } | |
|    } | |
|    if( asps_plr_enabled_flag ) | |
|       plr_data( tileID, patchIdx ) | |
|    if( asps_miv_extension_present_flag ) | |
|       pdu_miv_extension( tileID, patchIdx ) /* Specified in ISO/IEC 23090-12 */ | |
|    if( asps_mesh_extension_present_flag ) | |
|       pdu_mesh_extension( tileID, patchIdx ) | |
| } | |

1002 — brace pointing to the asps_mesh_extension block

| pdu_mesh_extension ( tileID, patchIdx ) { | Descriptor |
|---|---|
|    if(asps_remeshing_enable_flag == 1) { | |
|       pdu_remeshing_enable_flag [ tileID ][ patchIdx ] | |
|       If(pdu_remeshing_enable_flag [ tileID ][ patchIdx ] == 1 ) { | |
|          pdu_remeshing_local_window_size_x[ tileID ][ patchIdx ] | ue(v) |
|          pdu_remeshing_local_window_size_y[ tileID ][ patchIdx ] | ue(v) |
|       } | |
|    } | |
| } | |

1004

FIG. 10

| patch_information_data( tileID, patchIdx, patchMode ) { | Descriptor |
|---|---|
|    if( ath_type == P_TILE ) { | |
|       if( patchMode == P_SKIP ) | |
|          skip_patch_data_unit( ) | |
|       else if( patchMode == P_MERGE ) | |
|          merge_patch_data_unit( tileID, patchIdx ) | |
|       else if( patchMode == P_INTRA ) | |
|          patch_data_unit( tileID, patchIdx ) | |
|       else if( patchMode == P_INTER ) | |
|          inter_patch_data_unit( tileID, patchIdx ) | |
|       else if( patchMode == P_RAW ) | |
|          raw_patch_data_unit( tileID, patchIdx ) | |
|       else if( patchMode == P_EOM ) | |
|          ~~eom_patch_data_unit( tileID, patchIdx )~~ | |
|       else if( patchMode == P_ALL_PACHES_INFO ) | |
|          api_patch_data_unit( tileID, patchIdx ) | |
|    } | |
|    else if( ath_type == I_TILE ) { | |
|       if( patchMode == I_INTRA ) | |
|          patch_data_unit( tileID, patchIdx ) | |
|       else if( patchMode == I_RAW ) | |
|          raw_patch_data_unit( tileID, patchIdx ) | |
|       else if( patchMode == I_EOM ) | |
|          eom_patch_data_unit( tileID, patchIdx ) | |
|       else if( patchMode == P_ALL_PACHES_INFO ) | |
|          api_patch_data_unit( tileID, patchIdx ) | |
|    } | |
| } | |

1102 — else if( patchMode == P_ALL_PACHES_INFO ) / api_patch_data_unit( tileID, patchIdx )

1104 — else if( patchMode == P_ALL_PACHES_INFO ) / api_patch_data_unit( tileID, patchIdx )

| api_patch_data_unit( tileID, patchIdx ) { | Descriptor |
|---|---|
|    ... | |
| } | |

FIG. 11